(12) United States Patent
Ito et al.

(10) Patent No.: US 7,876,502 B2
(45) Date of Patent: *Jan. 25, 2011

(54) OPTICAL FILM, POLARIZING PLATE AND LIQUID CRYSTAL DISPLAY

(75) Inventors: Yoji Ito, Minami-Ashigara (JP); Yoshiaki Hisakado, Minami-Ashigara (JP); Yuta Takahashi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 484 days.

This patent is subject to a terminal disclaimer.

(21) Appl. No.: 11/911,993

(22) PCT Filed: Apr. 20, 2006

(86) PCT No.: PCT/JP2006/308792
§ 371 (c)(1),
(2), (4) Date: Oct. 19, 2007

(87) PCT Pub. No.: WO2006/115280
PCT Pub. Date: Nov. 2, 2006

(65) Prior Publication Data
US 2009/0052032 A1      Feb. 26, 2009

(30) Foreign Application Priority Data

| Apr. 22, 2005 | (JP) | ............................ 2005-125356 |
| Apr. 22, 2005 | (JP) | ............................ 2005-125357 |
| Jun. 30, 2005 | (JP) | ............................ 2005-192312 |
| Jun. 30, 2005 | (JP) | ............................ 2005-192313 |

(51) Int. Cl.
*G02B 5/30*      (2006.01)
(52) U.S. Cl. ........................ 359/492; 359/494; 359/500

(58) Field of Classification Search .................... 349/18, 349/94, 99, 102, 103, 194, FOR. 114; 359/490, 359/492, 494, 497, 499–501; 362/19; 428/1.31, 428/1.33; 313/112
See application file for complete search history.

(56) References Cited

U.S. PATENT DOCUMENTS 4,994,214 A * 2/1991 Stevens et al. .............. 264/476

(Continued)

FOREIGN PATENT DOCUMENTS

EP          0 669 542 A1      8/1995

(Continued)

OTHER PUBLICATIONS

Form PTC/ISA/210 (International Search Report) dated Aug. 22, 2006.

(Continued)

*Primary Examiner*—Frank G Font
(74) *Attorney, Agent, or Firm*—Buchanan Ingersoll & Rooney PC

(57) ABSTRACT

An optical film is provided and includes a transparent polymer film. The optical film has at least an A1 value defined by Re (450)/Re (550) of from 0.10 to 0.95 and A2 value defined by Re (650)/Re (550) of from 1.01 to 1.50. Re ($\lambda$) represents the retardation value of the film with respect to light having a wavelength of $\lambda$ nm; and Rth ($\lambda$) is the retardation value in the thickness direction of film with respect to light having a wavelength of $\lambda$ nm.

21 Claims, 7 Drawing Sheets

U.S. PATENT DOCUMENTS

| | | | |
|---|---|---|---|
| 6,115,095 A | 9/2000 | Suzuki et al. | |
| 6,184,957 B1 | 2/2001 | Mori et al. | |
| 6,285,429 B1 | 9/2001 | Nishida et al. | |
| 6,285,430 B1 | 9/2001 | Saito | |
| 7,236,221 B2 * | 6/2007 | Ishikawa et al. | 349/119 |
| 7,586,571 B2 * | 9/2009 | Yoshimi et al. | 349/119 |
| 2003/0219549 A1 | 11/2003 | Shimizu | |
| 2006/0132686 A1 * | 6/2006 | Jeon et al. | 349/117 |

FOREIGN PATENT DOCUMENTS

| | | |
|---|---|---|
| JP | 2-176625 A | 7/1990 |
| JP | 9-080424 A | 3/1997 |
| JP | 9-211444 A | 8/1997 |
| JP | 9-292522 A | 11/1997 |
| JP | 10-054982 A | 2/1998 |
| JP | 10-307291 A | 11/1998 |
| JP | 11-077822 A | 3/1999 |
| JP | 11-095208 A | 4/1999 |
| JP | 11-133408 A | 5/1999 |
| JP | 11-202323 A | 7/1999 |
| JP | 11-305217 A | 11/1999 |
| JP | 11-316378 A | 11/1999 |
| JP | 2000-137116 A | 5/2000 |
| JP | 2000-227520 A | 8/2000 |
| JP | 2002-221622 A | 8/2002 |
| JP | 2003-015134 A | 1/2003 |
| WO | WO 00/65384 A1 | 11/2000 |
| WO | WO 2004/068226 A1 | 8/2004 |
| WO | WO 2005/022214 A1 | 3/2005 |

OTHER PUBLICATIONS

Form PCT/ISA/237 (Written Opinion of the International Searching Authority) dated Aug. 22, 2006.

Extended European Search Report issued Oct. 21, 2010 in corresponding European Application No. 06732398.0.

* cited by examiner

60° RIGHTWISE

60° LEFTWISE

60° LEFTWISE

60° RIGHTWISE

60° RIGHTWISE

60° LEFTWISE

OPTICAL FILM, POLARIZING PLATE AND LIQUID CRYSTAL DISPLAY

TECHNICAL FIELD

The present invention relates to an optical film, and a polarizing plate and a liquid crystal display comprising the same.

BACKGROUND ART

A liquid crystal display has a liquid crystal cell and a polarizing plate. The polarizing plate normally has a protective film and a polarizer and is obtained by dyeing a polarizer made of a polyvinyl alcohol film with iodine, stretching the polarizer thus dyed, and then laminating the polarizer with a protective layer on the sides thereof. A transmission type liquid crystal display comprises a polarizing plate attached to the both sides of a liquid crystal cell and optionally one or more sheets of optically-compensatory film provided therein. A reflection type liquid crystal display normally comprises a reflective plate, a liquid crystal cell, one or more sheets of optically-compensatory film and a polarizing plate provided therein in this order. The liquid crystal cell comprises a liquid crystal compound, two sheets of substrates for enclosing the liquid crystal compound therein and an electrode layer for applying a voltage to the liquid crystal compound. The liquid crystal cell performs ON/OFF display depending on the difference in alignment of liquid crystal compound. Display modes such as TN (Twisted Nematic), IPS (In-Plane Switching), OCB (Optically Compensatory Bend), VA (Vertically Aligned), and ECB (Electrically Controlled Birefringence), which can be applied to both transmission and reflection type display devices, have been proposed.

As those requiring a high fidelity display among these LCD's there are mainly used 90° twisted nematic liquid crystal displays (hereinafter referred to as "TN mode") comprising a nematic liquid crystal compound having a positive dielectric anisotropy which are driven by a thin-film transistor. These TN mode liquid crystal displays exhibit excellent display properties as viewed on the front but are disadvantageous from the standpoint of display properties in that they exhibit a lowered contrast as viewed obliquely or gradation inversion during gradation display. It has been keenly desired to provide improvements in these display properties.

On the other hand, wide viewing liquid crystal systems such as IPS mode, OCB mode and VA mode have increased its share with the recent increase of demand for liquid crystal television sets. The display fidelity of the various modes of liquid crystal display has been enhanced from year to year (JP-A-9-211444, JP-A-11-316378, JP-A-2-176625, JP-A-11-95208, JP-A-2003-15134, JP-A-11-95208, JP-A-2002-221622, JP-A-9-80424, JP-A-10-54982, JP-A-11-202323, JP-A-9-292522, JP-A-11-133408, JP-A-11-305217 and JP-A-10-307291). However, these modes of liquid crystal display still leave something to be desired in solution to problem of color difference developed when viewed obliquely.

It has heretofore been known that the retarder plate, particularly ¼ wavelength plate, for polymer aligned film is required to satisfy the relationships 0.6<Δn·d (450)/Δn·d (550)<0.97 and 1.01<Δn·d (650)/Δn·d (550)<1.35 (in which Δn·d (λ) represents the retardation of the polymer aligned film at a wavelength of λ nm) (JP-A-2000-137116).

DISCLOSURE OF THE INVENTION

An object of an illustrative, non-limiting embodiment of the invention is to provide an optical film, which can accurately compensate optically a liquid crystal display, particularly of VA, IPS or OCB mode, to give a high contrast and eliminate color difference dependent on the direction of viewing angle during black display and a polarizing plate comprising same. Another object of an illustrative, non-limiting embodiment of the invention is to provide a liquid crystal display, particularly of VA, IPS or OCB mode, which exhibits an enhanced contrast and eliminated color difference dependent on the direction of viewing angle during black display.

Means for solving the problems of the invention will be described hereinafter.

1-1. A method for producing an optical film comprising a transparent polymer film, which comprises stretching the transparent polymer film at a temperature of from (Tg+25° C.) to (Tg+100° C.), wherein Tg is a glass transition point of a polymer of the transparent polymer film.

1-2. An optical film comprises a transparent polymer film produced by a method defined in Clause 1-1, wherein the optical film has an A1 value defined by equation (1) of 0.10 to 0.95 and an A2 value defined by equation (2) of 1.01 to 1.50:

$$A1\ \text{value} = Re(450)/Re(550) \quad (1)$$

$$A2\ \text{value} = Re(650)/Re(550) \quad (2)$$

where Re (λ) represents a retardation value of the optical film with respect to light having a wavelength of λ nm.

1-3. The optical film as defined in Clause 1-2, wherein the transparent polymer film has a crystallization peak in an X-ray diffractometry thereof.

1-4. The optical film as defined in Clause 1-2 or 1-3, wherein the transparent polymer film has a degree of alignment of 0.04 to 0.30, the degree of alignment being calculated from an X-ray diffractometry of the transparent polymer film and defined by equation (3):

$$P = <3\cos^2 \beta - 1>/2 \quad (3)$$

wherein $<\cos^2 \beta>$ represents $\int(0, \pi)\cos^2 \beta I(\beta) \sin \beta d\beta / \int(0, \pi) I(\beta) \sin \beta d\beta$; β is an angle of a surface on which X-rays are incident with respect to one direction in a plane of the transparent polymer film; and I is the diffraction intensity at 2θ of 8° in an X-ray diffraction chart measured at angle β.

1-5. The optical film as defined in any one of Clauses 1-2 to 1-4, wherein the transparent polymer film comprises a compound in an amount of 0.01 to 20% by weight, the compound having a maximum absorption wavelength λ max shorter than 250 nm in a ultraviolet absorption spectrum of a solution of the compound.

1-6. The optical film as defined in any one of Clauses 1-2 to 1-5, which comprises an optically anisotropic layer comprising a discotic liquid crystal compound, wherein the discotic liquid crystal compound has a disc surface having an angle of 5 degrees or less with respect to a surface of the transparent polymer film.

1-7. The optical film as defined in any one of Clauses 1-2 to 1-5, which comprises an optically anisotropic layer comprising a rod-shaped liquid crystal compound, wherein the discotic liquid crystal compound has a major axis having an angle of 5 degrees or less with respect to a surface of the transparent polymer film.

1-8. The optical film as defined in any one of Clauses 1-2 to 1-5, wherein the transparent polymer film comprises a compound in an amount of 0.01 to 20% by weight, the compound having a maximum absorption wavelength λmax longer than 250 nm a ultraviolet absorption spectrum of a solution of the compound.

1-9. The optical film as defined in any one of Clauses 1-2 to 1-8, wherein the transparent polymer film comprises cellulose acylate.

1-10. The optical film as defined in any one of Clauses 1-2 to 1-8, which has a B1 value defined by equation (4) of from 0.40 to 0.95, a B2 value defined by equation (5) of 1.05 to 1.93, and Rth (550) of 70 nm to 400 nm:

$$B1\ value=\{Re(450)/Rth(450)\}/\{Re(550)/Rth(550)\} \quad (4)$$

$$B2\ value=\{Re(650)/Rth(650)\}/\{Re(550)/Rth(550)\} \quad (5)$$

wherein Re (λ) represents a retardation value of the optical film with respect to light having a wavelength of λ nm, and Rth (λ) is a retardation value in a thickness direction of the optical film with respect to light having a wavelength of λ nm.

1-11. A polarizing plate comprising: a polarizer; and an optical film as defined in any one of Clauses 1-2 to 1-10.

1-12. A liquid crystal display comprising: a liquid crystal cell; and a polarizing plate as defined in Clause 1-11.

1-13. The liquid crystal display as defined in Clauses 1-12, wherein the liquid crystal cell is of VA, OCB or IPS mode.

2-1. An optical film comprising a transparent polymer film, wherein the optical film has an A1 value defined by equation (1) of 0.10 to 0.95, an A2 value defined by equation (2) of 1.01 to 1.50, a B1 value defined by equation (4) of from 0.40 to 0.95, a B2 value defined by equation (5) of 1.05 to 1.93, and Rth (550) of 70 nm to 400 nm:

$$A1\ value=Re(450)/Re(550) \quad (1)$$

$$A2\ value=Re(650)/Re(550) \quad (2)$$

$$B1\ value=\{Re(450)/Rth(450)\}/\{Re(550)/Rth(550)\} \quad (4)$$

$$B2\ value=\{Re(650)/Rth(650)\}/\{Re(550)/Rth(550)\} \quad (5)$$

wherein Re (λ) represents a retardation value of the optical film with respect to light having a wavelength of λ nm; and Rth (λ) is a retardation value in a thickness direction of the optical film with respect to light having a wavelength of λ nm.

2-2. The optical film as defined in Clause 2-1, wherein the transparent polymer film has a crystallization peak in an X-ray diffractometry thereof.

2-3. The optical film as defined in Clauses 2-1 or 2-2, wherein the transparent polymer film has a degree of alignment of 0.04 to 0.03, the degree of alignment being calculated from an X-ray diffractometry of the transparent polymer film and defined by equation (3):

$$P=<3\cos^2\beta-1>/2 \quad (3)$$

wherein $<\cos^2\beta>$ represents $\int(0, \pi)\cos^2\beta I(\beta)\sin\beta d\beta/\int(0, \pi) I(\beta)\sin\beta d\beta$; β is an angle of a surface on which X-ray is incident with respect to one direction in a plane of the transparent polymer film; and I is a diffraction intensity at 2θ of 8° in an X-ray diffraction chart measured at the angle β.

2-4. The optical film as defined in any one of Clauses 2-1 to 2-3, wherein the transparent polymer film comprises a compound in an amount of 0.01 to 30% by weight, the compound having a maximum absorption wavelength λmax shorter than 250 nm in a ultraviolet absorption spectrum of a solution of the compound.

2-5. The optical film as defined in any one of Clauses 2-1 to 2-4, wherein the transparent polymer film comprises a compound in an amount of 0.01 to 20% by weight, the compound having a maximum absorption wavelength λmax longer than 250 nm a ultraviolet absorption spectrum of a solution of the compound.

2-6. The optical film as defined in any one of Clauses 2-1 to 2-5, which comprises an optically anisotropic layer comprising a discotic liquid crystal compound, wherein the discotic liquid crystal compound has a disc surface having an angle of 5 degrees or less with respect to a surface of the transparent polymer film.

2-7. The optical film as defined in any one of Clauses 2-1 to 2-6, wherein the transparent polymer film comprises cellulose acylate.

2-8. A polarizing plate comprising: a polarizer, and an optical film as defined in any one of Clauses 2-1 to 2-7.

2-9. A liquid crystal display comprising: a liquid crystal cell; and a polarizing plate as defined in Clause 2-8.

2-10. The liquid crystal display as defined in Clause 2-9, wherein the liquid crystal cell is of VA, OCB or IPS mode.

The terms "45°", "parallel" and "perpendicular" as used herein are meant to indicate that they fall within the range of (precise angle)±less than 5°. The error from the precise angle is preferably less than 4°, more preferably less than 3°. The sign "+" attached to the angle means clockwise and the sign "−" attached to the angle means counterclockwise. The term "slow axis" as used herein is meant to indicate the direction in which the refractive index reaches maximum. In addition, the term "visible light wavelength range" as used herein is meant to indicate a wavelength range of from 380 nm to 780 nm. The wavelength λ at which the refractive index is measured is 550 nm in the visible light wavelength range unless otherwise specially defined.

The term "polarizing plate" as used herein is meant to include a polarizing plate of continuous length and a slit polarizing plate having a size that can be incorporated in a liquid crystal display (The term "slit" as used herein is meant to include "punch" and "cut"). Further, the term "polarizer" and the term "polarizing plate" are distinguished herein. The term "polarizing plate" as used herein is meant to indicate a laminate comprising a "polarizer" having a protective film for protecting the polarizer provided on at least one side thereof.

The term "molecular symmetric axis" as used herein is meant to indicate rotary symmetric axis, if any present in the molecule. However, it is not required that the molecule have a rotary symmetry in strict sense. In general, the molecular symmetric axis of a disc-shaped liquid crystal compound coincides with the axis passing through the center of the disc surface perpendicular to the disc surface. The molecular symmetric axis of a rod-shaped liquid crystal compound coincides with the major axis of the molecule.

The terms "Re(λ)" and "Rth(λ)" as used herein are meant to indicate in-plane retardation and thickness direction retardation, at a wavelength λ, respectively. Re(λ) is a value measured when light having a wavelength λ nm is incident in the direction normal to the film using "KOBRA 21ADH" (produced by Ouji Scientific Instruments Co. Ltd.). Rth(λ) is calculated by "KOBRA 21ADH" on the basis of retardation values measured in the total three directions, i.e., Re(λ), retardation value measured by the incidence of light having a wavelength λ nm in the direction inclined at an angle of +40° from the direction normal to the film with the in-plane slow axis (judged by "KOBRA 21ADH") as an inclined axis, retardation value measured by the incidence of light having a wavelength λ nm in the direction inclined at an angle of −40° from the direction normal to the film with the in-plane slow axis as an inclined axis. By inputting the hypothetic average refractive indexes (1.48) and film thicknesses, KOBRA 21ADH calculates nx, ny and nz.

The invention has been worked out on the basis of knowledge obtained as a result of extensive studies made by the inventors. The use of the aforementioned optical film allows viewing angle compensation in black state particularly of VA, IPS or OCB mode over almost all wavelength ranges. As a result, the liquid crystal display of the invention exhibits eliminated light leakage in oblique direction during black display and a remarkably enhanced viewing angle contrast. Further, a liquid crystal display of the invention can suppress light leakage in oblique direction during black display over almost all visible light wavelength ranges and thus attain drastic elimination of color difference during black display dependent on viewing angle, which is a problem with the related art technique.

DESCRIPTION OF REFERENCE NUMERALS AND SIGNS

Figure 1:
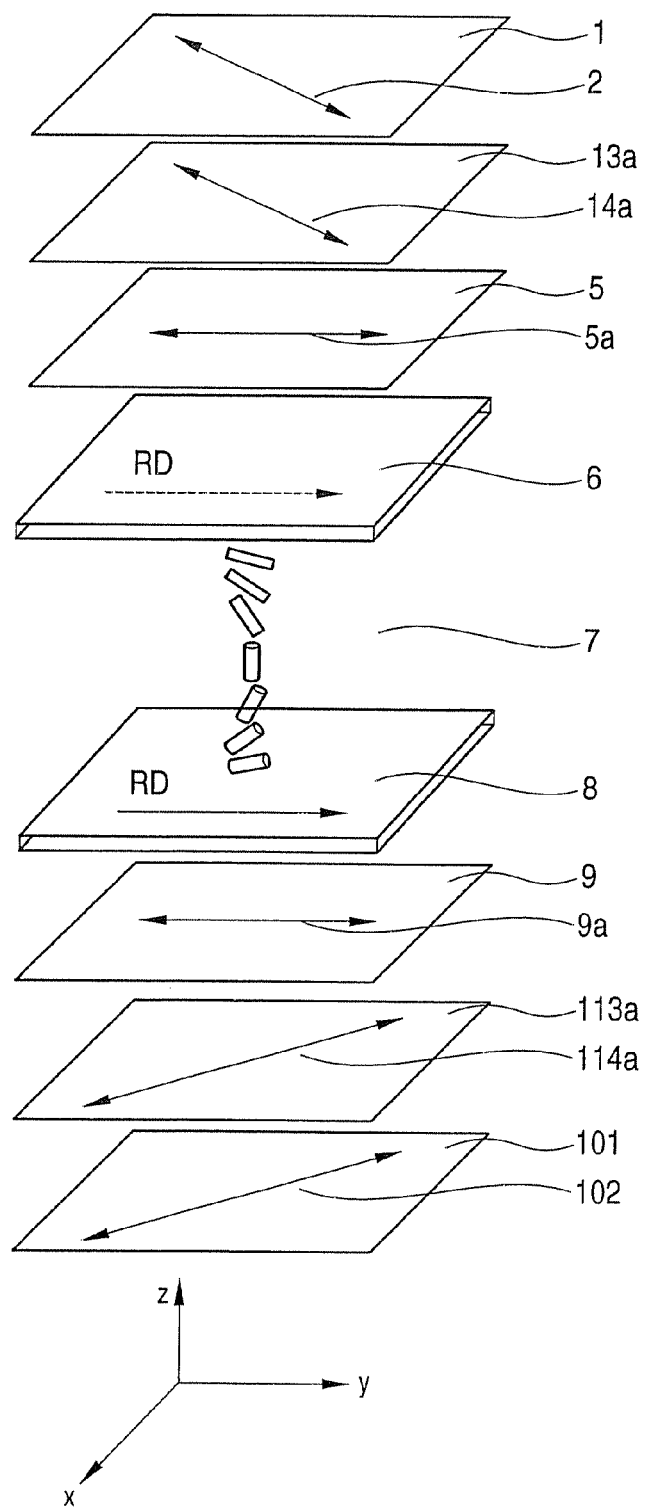
FIG. 1 is a schematic diagram illustrating an illustrative, non-limiting example of configuration (OCB mode) of a liquid crystal display of the invention.

1 Polarizer
2 Transmission axis
3a Support
13a Optical film
14a In-plane slow axis
5 Optically anisotropic layer
5a Average alignment direction of molecular symmetric axes of liquid crystal compound on the polarizer side (optical film interface side)
6 Substrate
7 Liquid crystal molecule
8 Substrate
9 Optically anisotropic layer
9a Average alignment direction of molecular symmetric axes of liquid crystal compound on the polarizer side (optical film interface side)
103a Support
113a Optical film
114a In-plane slow axis
101 Polarizer
102 Transmission axis
201 Liquid crystal element pixel region
202 Pixel electrode
203 Display electrode
204 Rubbing direction
205a, 205b Director of liquid crystal compound in black display
206a, 206b Director of liquid crystal compound in white display

DETAILED DESCRIPTION OF THE INVENTION

[Optically Anisotropic Layer]

Firstly, an exemplary action of the invention will be described in combination with the attached drawings.

FIG. 1 depicts an exemplary example of the configuration of a liquid crystal display of the invention. The OCB mode liquid crystal display shown in FIG. 1 has a liquid crystal cell including a liquid crystal layer 7 which has liquid crystal molecules bend-aligned with respect to the surface of substrate during the application of a voltage, i.e., in black display and substrates 6 and 8 between which the liquid crystal layer 7 is disposed interposed. The substrates 6 and 8 each has its liquid crystal surface aligned. The rubbing direction is shown by the arrow RD. The direction of rubbing made on the surface of the substrate which cannot be seen in the drawing is shown by the arrow RD with a broken line. Polarizers 1 and 101 are disposed with a liquid crystal cell interposed therebetween. The polarizers 1 and 101 are disposed in such an arrangement that the transmission axes 2 and 102 thereof are disposed perpendicular to each other and at an angle of 45° with respect to RD of the liquid crystal layer 7 of the liquid crystal cell. Disposed interposed between the polarizer 1 and the liquid crystal cell and between the polarizer 101 and the liquid crystal cell are cellulose acylate films 13a and 113a and optically anisotropic layers 5 and 9, respectively. The cellulose acylate films 13a and 113a are disposed in such an arrangement that the slow axes 14a and 114a thereof are disposed parallel to the direction of the transmission axes 2 and 102 of the polarizers 1 and 101 to which they are adjacent, respectively. The optically anisotropic layers 5 and 9 each have an optical anisotropy developed by the alignment of the liquid crystal compound.

The liquid crystal cell in FIG. 1 comprises the upper substrate 6, the lower substrate 8 and a liquid crystal layer formed by liquid crystal molecules 7 interposed therebetween. Formed on the surface of the upper substrate 6 and the lower substrate 8 in contact with the liquid crystal molecules 7 (hereinafter occasionally referred to as "inner surface") is an alignment layer (not shown) by which the liquid crystal molecules 7 are controlled to be aligned parallel to the surface of the alignment layer at a pretilt angle when no or a low voltage is applied thereto. Also formed on the inner surface of the upper substrate 6 and the lower substrate 8 is a transparent electrode (not shown) capable of applying a voltage to the liquid crystal formed by liquid crystal molecules 7. In the invention, the product $\Delta n \cdot d$ of the thickness d (μm) of the liquid crystal layer and the refractive index anisotropy $\Delta n$ of the liquid crystal layer is preferably from 0.1 to 1.5 μm, more preferably from 0.2 to 1.5 μm, even more preferably from 0.3 to 1.2 μm, still more preferably from 0.4 to 1.0 μm. When the product $\Delta n \cdot d$ falls within the above defined range, the brightness of white display during the application of voltage for white display is high, making it possible to obtain a display device having a high brightness and contrast. The liquid crystal material to be used herein is not specifically limited. However, in an embodiment wherein an electric field is applied across the upper and lower substrates 6 and 8, a liquid crystal material which exhibits a positive anisotropy in dielectric constant so that the liquid crystal molecules 7 respond in parallel to the direction of the electric field is used.

In the case where as the liquid crystal cell there is used an OCB mode liquid crystal cell for example, a nematic liquid crystal material having a positive anisotropy in dielectric constant, $\Delta n$ of 0.16 and $\Delta \in$ of about 5 may be provided interposed between the upper and lower substrates 6 and 8. The thickness d of the liquid crystal layer is not specifically limited. However, in the case where a liquid crystal having properties as defined above is used, the thickness d of the liquid crystal layer may be predetermined to about 4 µm. Since the brightness of white display varies with the product $\Delta n \cdot d$ of the thickness d of the liquid crystal layer and the refractive index anisotropy $\Delta n$ of the liquid crystal layer, the product $\Delta n \cdot d$ during the application of no voltage is preferably predetermined to a range of from 0.4 to 1.0 µm to obtain a sufficient brightness during the application of voltage for white display.

OCB mode liquid crystal displays rarely comprise a chiral material which is normally incorporated in TN mode liquid crystal displays because it deteriorates dynamic response. However, a chiral material is occasionally incorporated in OCB mode liquid crystal devices. In the case of multi-domain structure, a chiral material is useful in the adjustment of alignment of liquid crystal molecules in the region of border of various domains. The multi-domain structure indicates one pixel of liquid crystal display which is divided into a plurality of regions. For example, an OCB mode liquid crystal display having a multi-domain structure exhibits improvements in viewing angle properties such as brightness and color tone to advantage. In some detail, by forming each of pixels by two or more (preferably 4 or 8) regions having different initial alignments of liquid crystal molecules to form an averaged structure, the deviation of brightness or color tone due to viewing angle can be eliminated. The same effect can be exerted also by forming each of pixels by two or more different regions showing continuous change of direction of alignment of liquid crystal molecules upon the application of voltage.

The optical films 13a and 113a each may act as a support for the optically anisotropic layers 5 and 9, respectively, or may act as a protective film for the polarizers 1 and 101, respectively, or may act as both support and protective film. In other words, the polarizer 1, the optical film 13a and the optically anisotropic layer 5 or the polarizer 101, the optical film 113a and the optically anisotropic layer 9 may be incorporated in the liquid crystal display as an integrated laminate or a single member. An arrangement may be made such that a separate protective film for protective film is disposed interposed between the optical film 13a and the polarizer 1 or between the optical film 113a and the polarizer 101. However, the protective film is preferably not provided. The slow axis 14a of the optical film 13a and the slow axis 114a of the optical film 113a are preferably disposed substantially parallel or perpendicular to each other. When the slow axes 14a and 114a of the optical films 13a and 113a are disposed perpendicular to each other, the birefringence of the optical films 13a and 113a can be cancelled off by each other to eliminate the deterioration of optical properties of light incident perpendicular to the liquid crystal display. In an embodiment where the slow axes 14a and 114a are disposed parallel to each other, the residual retardation of the liquid crystal layer, if any, can be compensated by the birefringence of the protective film.

The transmission axes 2 and 102 of the polarizers 1 and 101, the direction of the slow axes 14a and 114a of the optical films 13a and 113a and the alignment direction of the liquid crystal molecule 7 are adjusted within optimum range depending on the materials to be used in the various members, the display mode, the laminated structure of members, etc. In other words, arrangement is made such that the transmission axis 2 of the polarizer 1 and the transmission axis 102 of the polarizer 101 are disposed substantially perpendicular to each other. However, the liquid crystal display of the invention is not limited to this configuration.

The optically anisotropic layers 5 and 9 are disposed interposed between the optical film 13a and the liquid crystal cell and between the optical film 113a and the liquid crystal cell, respectively. The optically anisotropic layers 5 and 9 each are a layer including a composition comprising a liquid crystal compound such as rod-shaped compound and disc-shaped compound. In the optically anisotropic layer, the molecules of the liquid crystal compound are fixed aligned as desired. The average alignment directions 5a and 9a of molecular symmetric axes of the liquid crystal compound in the optically anisotropic layers 5 and 9 on the interface at least on the optical film 13a side and optical film 113a side and the in-plane slow axes 14a and 114a of the optical films 3a and 113a cross each other at an angle of approximately 45°. In this arrangement, the optically anisotropic layer 5 or 9 generates retardation with respect to light incident in the direction along the normal line to prevent the occurrence of light leakage and can fully exert the effect of the invention with respect to light incident in oblique direction. On the interface on the liquid crystal cell side, too, the average alignment direction of molecular symmetric axes of the optically anisotropic layers 5 and 9 and the in-plane slow axes 14a and 114a of the cellulose acylate films 13a and 113a cross each other at an angle of approximately 45°.

Further, the average alignment direction 5a of molecular symmetric axes of the liquid crystal compound of the optically anisotropic layer 5 on the polarizer side thereof (optical film interface side) is preferably disposed at an angle of approximately 45° with respect to the slow axis 2 of the polarizer 1 which is disposed closer thereto. Similarly, the average alignment direction 9a of molecular symmetric axes of the liquid crystal compound of the optically anisotropic layer 9 on the polarizer side thereof (optical film interface side) is preferably disposed at an angle of approximately 45° with respect to the slow axis 102 of the polarizer 101 which is disposed closer thereto. In this arrangement, optical switching can be made depending on the sum of retardation generated by the optically anisotropic layer 5 or 9 and retardation generated by the liquid crystal layer and the effect of the invention can be fully exerted on light incident in oblique direction.

The principle of the image display of the liquid crystal display of FIG. 1 will be described hereinafter.

In the driven state wherein a driving voltage corresponding to black display is applied to the transparent electrode (not shown) of the liquid crystal cell substrates 6 and 8, the liquid crystal molecules 7 in the liquid crystal layer are bend-aligned to cause the in-plane retardation to be cancelled out by the in-plane retardation of the optically anisotropic layers 5 and 9. As a result, the polarization of incident light shows little change. Since the transmission axes 2 and 102 of the polarizers 1 and 101 are disposed perpendicular to each other, the light incident on the lower side is polarized by the polarizer 101, transmitted by the liquid crystal cells 6 to 8 while being kept polarized, and then blocked by the polarizer 1. In other words, the liquid crystal display of FIG. 1 realizes an ideal black display in the driven state. On the contrary, in the driven state wherein a driving voltage corresponding to white display is applied to the transparent electrodes (not shown), the liquid crystal molecules 7 in the liquid crystal layer are bend-aligned in a manner different from that of black display, showing in-plane retardation different from that of black display as viewed from the front. As a result, the in-plane retardation is not cancelled out by the in-plane retardation of the optically anisotropic layers 5 and 9. Therefore, the incident light changes in its polarization when transmitted by the liquid crystal cells 6 to 8, and then transmitted by the polarizer 1. In other words, white display is provided.

OCB mode liquid crystal displays have heretofore been disadvantageous in that they show a high contrast as viewed on the front but show a low contrast as viewed obliquely. During black display, OCB mode liquid crystal displays show a high contrast obtained by the compensation of the liquid crystal cell and the optically anisotropic layer but show birefringence and rotation of polarizing axis of liquid crystal molecules 7 as viewed obliquely. Further, the angle of crossing of the transmission axes 2 and 102 of the upper and lower polarizers 1 and 101 is 90° as viewed on the front but is deviated from 90° as viewed obliquely. In the related art, it has been disadvantageous in that the two factors cause light leakage and hence a lowered contrast as viewed obliquely. In the liquid crystal display of the invention having the configuration shown in FIG. 1, the use of an optical film 13*a* (or 113*a*) having optical properties arranged such that Re/Rth in R, G and B do not coincide with each other and specific requirements are satisfied makes it possible to eliminate light leakage in oblique direction during black display and enhance contrast.

More particularly, the invention involves the use of an optical film having the aforementioned optical properties that allows optical compensation of light having various wavelength ranges R, G and B incident in oblique direction by slow axes and retardation values which are different from wavelength to wavelength. Further, optically anisotropic layers having liquid crystal compound molecules fixed aligned therein (5 and 9 in FIG. 1) are disposed in such an arrangement that the average alignment direction of molecular symmetric axes of the liquid crystal compound on the interface on the optical film side thereof and the slow axis of the optical film cross each other at an angle of 45°, making it possible to effect unique compensation for OCB alignment over all the wavelength ranges. As a result, the viewing angle contrast in black display can be drastically enhanced and the occurrence of color difference in the viewing direction in black display can be drastically eliminated. In particular, a phenomenon has heretofore occurred that when the viewing angle swings horizontally), color difference occurs to produce horizontal asymmetry at a polar angle of 60° in the direction of azimuthal angle of 0° and 180°. This phenomenon) too, can be drastically eliminated.

Referring to the wavelength of R, G and B, the wavelength of R, G and B were 650 nm, 550 nm and 450 nm, respectively. The wavelength of R, G and B are not necessarily represented by these values. However, it is thought that these wavelength values are suitable for the definition of the optical properties that exert the effect of the invention.

Figure 2:
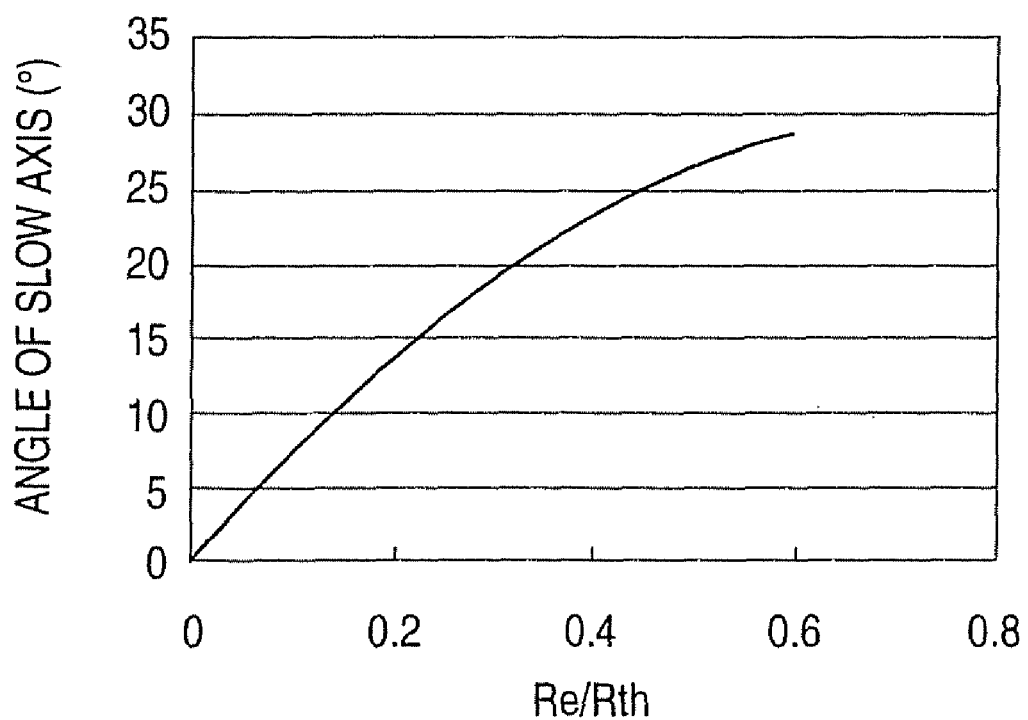
FIG. 2 is a graph illustrating the optical properties of an illustrative, non-limiting example of an optical film to be used in the invention.

In the invention, Re/Rth, which is the ratio of Re to Rth of the optical film, is particularly noted. This is because the value of Re/Rth determines the axis of two intrinsic polarized light beams in the propagation of light passing through a biaxial birefringent medium in oblique direction. The axis of two intrinsic polarized light beams in the propagation of light passing through a biaxial birefringent medium in oblique direction correspond to the direction of the major axis and the minor axis of the section made by cutting a refractive index ellipsoid in the direction along the line normal to the direction of propagation of light. FIG. 2 depicts an example of the results of calculation of relationship between the angle of the direction of one of the two intrinsic polarized light axes, i.e., slow axis and Re/Rth in the case where obliquely propagating light is incident on the optical film used in the invention.

In FIG. 2, the direction of propagation of light is assumed to have an azimuthal angle of 45° and a polar angle of 34°. As shown in FIG. 2, the angle of the slow axis is not dependent on the wavelength of incident light and is unequivocally determined by Re/Rth. How the incident light changes in its polarization when it passes through the optical film is determined mainly by the azimuth of the slow axis of the optical film and the retardation of the optical film. In the related art technique, however, the value of Re/Rth remains almost the same, that is, the angle of slow axis remains almost the same regardless of the wavelength of R, G and B. In the invention) on the contrary, the relationship of Re/Rth is defined separately for the wavelength of R, G and B to optimize both the slow axis and retardation which are factors determining mainly the change of polarization for the wavelength of R, G and B. Further, the value of Re/Rth of the optical film is adjusted depending on the wavelength such that when obliquely propagating light which has passed through the optical film passes through the optically anisotropic layer having liquid crystal compound molecules fixed aligned and then through a bend-aligned liquid crystal layer, two factors, i.e., deviation of retardation and apparent transmission axis of upper and lower polarizers from front at any wavelength can be compensated at the same time. In some detail, the higher the wavelength is, the more easily can be eliminated the difference in polarization at R, G and B developed by the wavelength dispersion of the optical film and the liquid crystal cell layer by raising Re/Rth of the optical film. As a result, complete compensation can be made, making it possible to eliminate contrast drop. By determining the parameter of the film with all the visible light ranges represented by R, G and B, almost complete compensation can be made over all the visible light ranges.

The polar angle and the azimuthal angle are defined here. The polar angle is the angle of tilt from the direction of line normal to the surface of the film, i.e., z axis in FIG. 1. For example, the direction of line normal to the surface of the film is represented by a polar angle of 0°. The azimuthal angle represents the azimuth of counterclockwise rotation with the positive direction of x axis as reference. For example, the positive direction of x axis is represented by an azimuthal angle of 0° and the positive direction of y axis is represented by an azimuthal angle of 90°. The oblique direction in which the problem of light leakage in black display is highest indicates a polar angle which is not 0° and an azimuthal angle of 0°, 90°, 180° and 270° since the polarization axis of the polarizing layer is ±45°.

Figure 3B:
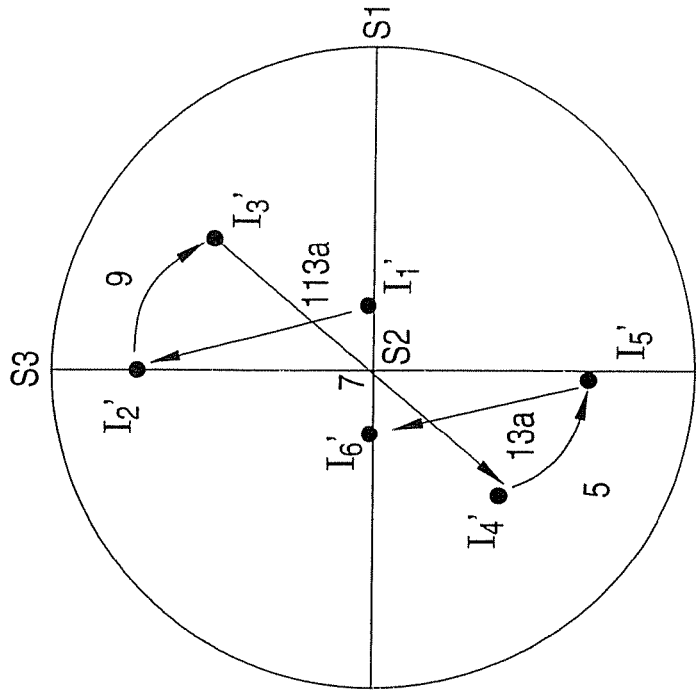
FIGS. 3A and 3B are schematic diagrams of a Poincare sphere used to explain the change of polarization of incident light in a liquid crystal display of the invention.
Figure 3A:
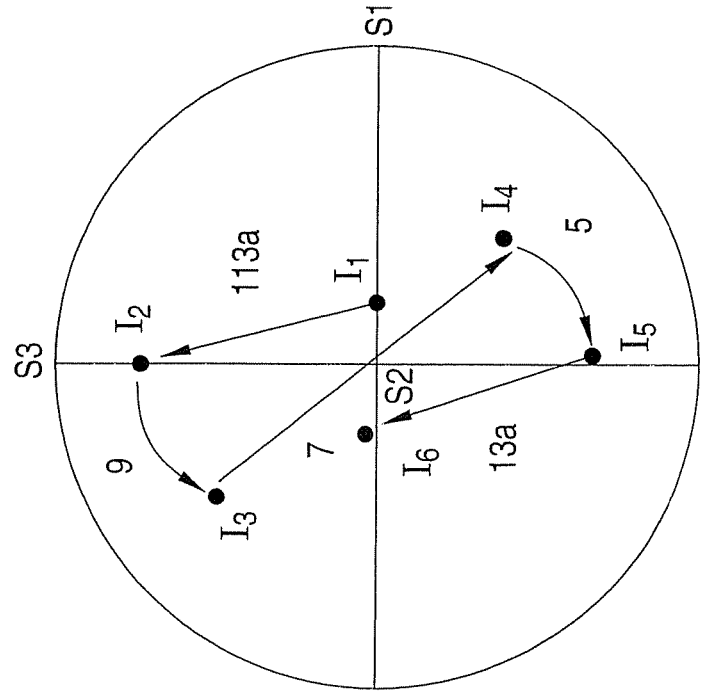

In order to explain the effect of the invention more specifically, the polarization of light incident on the liquid crystal display is shown on Poincare sphere in FIGS. 3A and 3B. In FIGS. 3A and 3B, S2 axis indicates an axis extending downward perpendicular to the paper as viewed on the drawing. FIGS. 3A and 3B are diagrams of a Poincare sphere as viewed from the positive direction of S2 axis. Since FIGS. 3A and 3B are shown two-dimensionally, the dislocation of point from before to after the change of polarization is shown by the arrow with straight line in the drawing. In actuality, however, the change of polarization of light developed by the passage of light through the liquid crystal layer or the optical film is shown on Poincare sphere by rotation at a specific angle on a specific axis determined by the respective optical properties. This applies also to FIGS. 5 and 6 below.

FIG. 3A depicts the change of polarization of G light incident on the liquid crystal display in FIG. 1 at an angle of 60° leftwise and FIG. 3B depicts the change of polarization of G light incident on the liquid crystal display at an angle of 60° rightwise. The optical properties of the optical films 13a and 113a and the optical properties of the optically anisotropic layers 5 and 9 were calculated on the assumption that they have the same conditions as that of Poincare sphere in FIG. 6 described later. G light incident on the liquid crystal display at an angle of 60° leftwise changes in its polarization as shown by points on Poincare sphere in FIG. 3A. In some detail, G light which has passed through the polarizer 101 shows polarization $I_1$. G light shows polarization $I_2$ when it has passed through the optical film 113a, polarization $I_3$ when it has passed through the optically anisotropic layer 9, polarization $I_4$ when it has passed through the liquid crystal layer 7 of the liquid crystal cell in black display, polarization $I_5$ when it has passed through the optically anisotropic layer 5, polarization $I_6$ when it has passed through the optical film 13a, and is then blocked by the polarizer 1 to make ideal black display. On the other hand, G light incident on the liquid crystal display at an angle of 60° rightwise shows similar polarization change, i.e., $I_1' \rightarrow I_2' \rightarrow I_3' \rightarrow I_4' \rightarrow I_5' \rightarrow I_6'$. A study of how the polarization changes shows that the change of polarization made by the passage through the optically anisotropic layers 9 and 5 and the liquid crystal layer 7 shows mirror symmetry between light beams incident on the liquid crystal display at an angle of 60° leftwise and rightwise while the change of polarization made by the passage of the optical films 113a and 13a are the same for light beams incident on the liquid crystal display at an angle of 60° leftwise and rightwise. In order to eliminate leftward and rightward light leakage in black display and color difference between left and right, it is necessary that these requirements for compensation be satisfied at the same time for left and right and at any wavelength. In other words, it is necessary that the position of $I_6$ and $I_6'$ coincide with each other and give polarization that allows blocking of light beams by the polarizer 1 not only for incident G light but also for incident R (red) and B (blue) light beams in the visible light range. While the aforementioned transition is shown by the straight line on the drawing, the transition shown on Poincare sphere is not limited to straight line.

Figure 4:
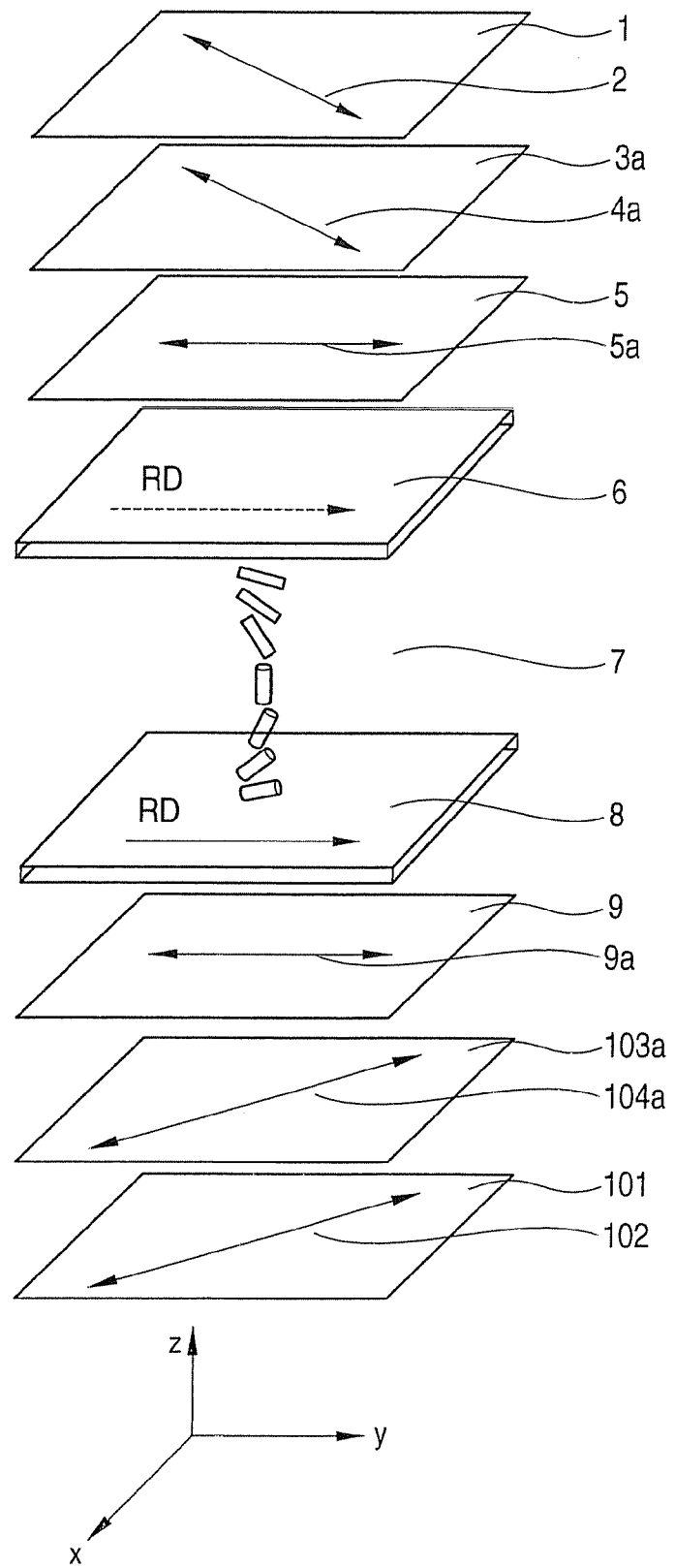
FIG. 4 is a schematic diagram illustrating an example of the configuration of the related art OCB mode liquid crystal display.

In the configuration of a related art OCB mode liquid crystal display as shown in FIG. 4 such as one disclosed in JP-A-11-316378, the optical films 113a and 13a having Re/Rth showing the aforementioned wavelength dependence are not disposed. Instead, transparent supports 103a and 3a for optically anisotropic layers 5 and 9 are disposed. The transparent supports 103 and 3 are used for the purpose of supporting the optically anisotropic layers 5 and 9 and are made of an ordinary polymer film. Accordingly, this OCB mode liquid crystal display shows no wavelength dependence of Re/Rth as shown by the optical films 113a and 13a and thus shows the same Re and Rth values at all R, G and B wavelength ranges. As a result, the related art OCB mode liquid crystal displays can cancel the front retardation of the liquid crystal cell and the optically anisotropic layer as viewed front ways during the application of a voltage, i.e., in black display to show black but cannot fully suppress light leakage in oblique direction during black display to disadvantage. Accordingly, no sufficient viewing angle contrast call be obtained and compensation cannot be made at all wavelength ranges, leaving the related art OCB mode liquid crystal displays something to be desired in solution to coloration.

Figure 5A:
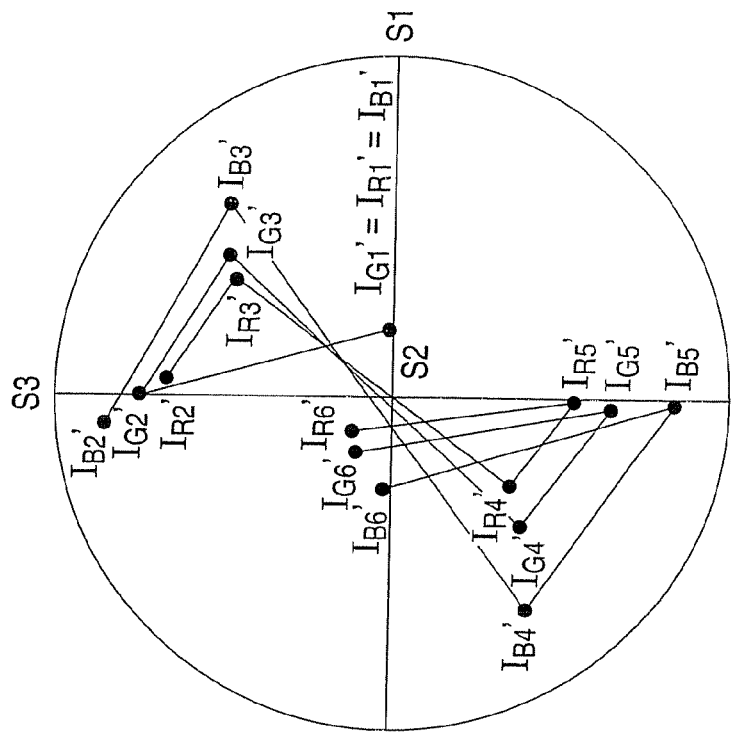
FIGS. 5A and 5B are schematic diagrams of a Poincare sphere used to explain the change of polarization of incident light in an example of the related art liquid crystal display.
Figure 5B:
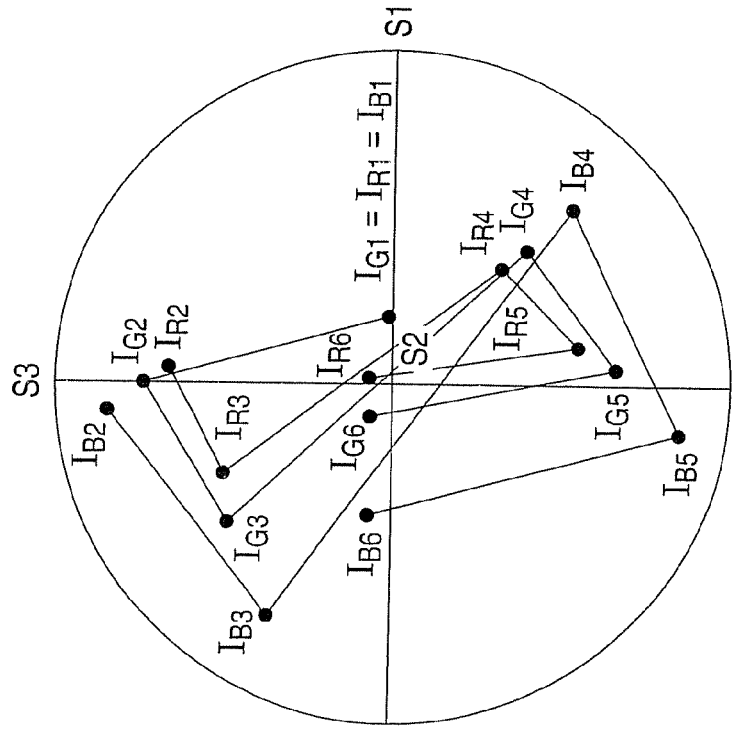

In order to explain more specifically, the results of calculation of polarization of R, G and B light beams incident on the related art OCB mode liquid crystal display having the configuration shown in FIG. 4 are shown on Poincare sphere in FIGS. 5A and 5B. FIG. 5A depicts the change of polarization of light incident on the liquid crystal display at an angle of 60° leftwise for each of R, G and B and FIG. 5B depicts the change of polarization of light incident on the liquid crystal display at an angle of 60° rightwise for each of R, G and B. In these diagrams, the polarization of incident R light is shown by $I_R$, the polarization of incident G light is shown by $I_G$, and the polarization of incident B light is shown by $I_B$. Calculation was also made for the configuration of the related art OCB mode liquid crystal display on the assumption that the transparent supports 3 and 103 in FIG. 4 have Re of 45 nm and Rth of 160 nm for each of R, G and B wavelength ranges and the optically anisotropic layers 5 and 9 have RE of 30 nm. Firstly, in FIG. 5A, the polarization $I_{R1}$, $I_{G1}$ and $I_{B1}$ of R, G and B light beams which have passed through the polarizer 101 are the same. Focusing on the change of polarization of B light, it is understood that B light incident on the liquid crystal display at an angle of 60° leftwise shows polarization $I_{B2}$ after passing through the transparent support 103, which is deflected in the same direction as transition made by the passage through the optically anisotropic layer 9 and B light incident on the liquid crystal display at an angle of 60° rightwise shows polarization $I_{B2}'$ after passing through the transparent support 103, which is deflected in the direction opposite that of transition made by the passage through the optically anisotropic layer 9. In other words, the polarization of light beams incident on the liquid crystal display leftwise and rightwise, respectively, are affected by the transparent support 103 in different manners. As a result, the position of the final transition states $I_{R6}$, $I_{G6}$ and $I_{B6}$ of R, G and B light beams incident at an angle of 60° leftwise and the position of the final transition states $I_{R6}'$, $I_{G6}'$ and $I_{B6}'$ of R, G and B light beams incident at an angle of 60° rightwise not only do not coincide with each other but also are quite different. Accordingly, leftwise and rightwise light leakage in black display and color difference between left and right occur. It has been heretofore difficult to eliminate the two defects at the same time.

Figure 6B:
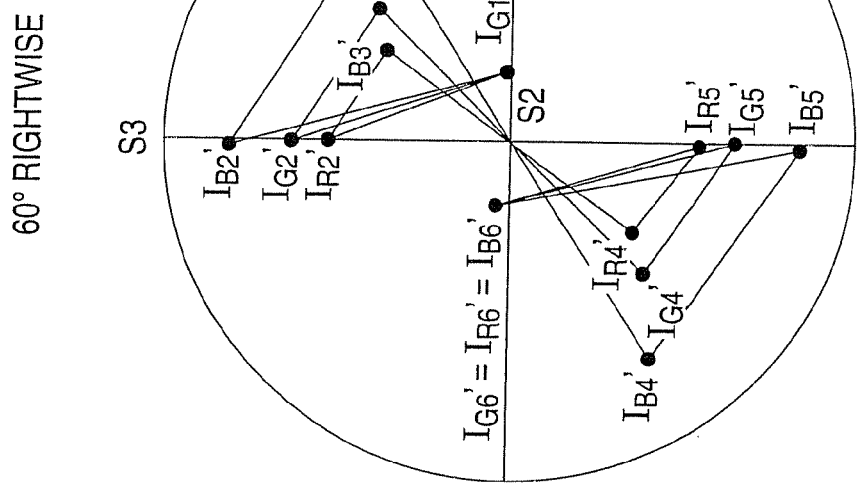
FIGS. 6A and 6B are schematic diagrams of a Poincare sphere used to explain the change of polarization of incident light in a liquid crystal display of the invention.
Figure 6A:
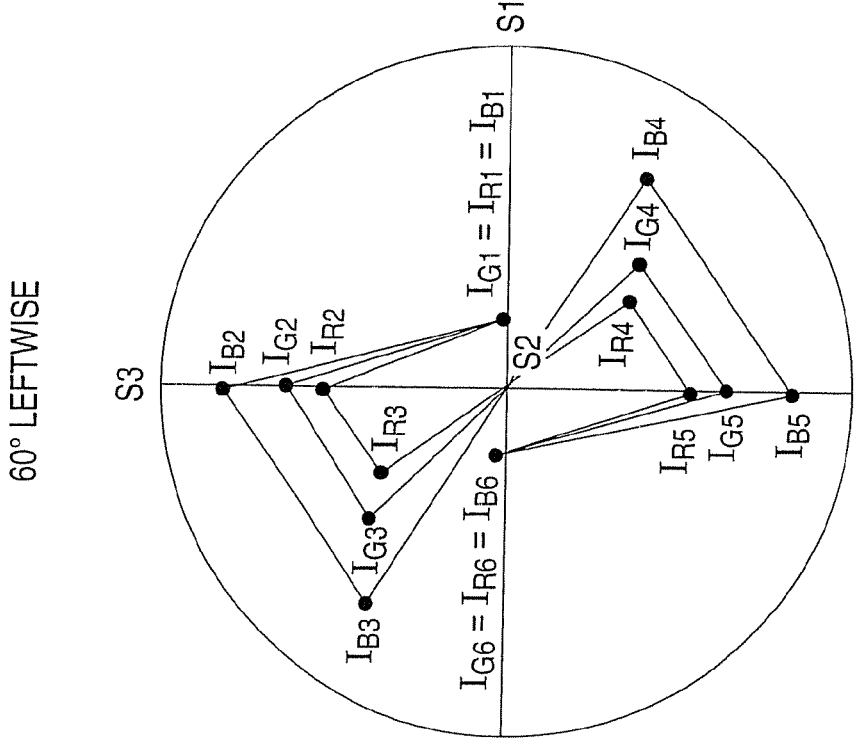

In the invention, the leftwise and rightwise light leakage in black display and the color difference between left and right of OCB mode liquid crystal displays can be eliminated at die same time by disposing an optical film showing specific optical properties. In order to explain this mechanism more specifically, the results of calculation of polarization of R, G and B light beams passing through an OCB mode liquid crystal display having the configuration of the invention shown in FIG. 1 are shown on Poincare sphere in FIGS. 6A and 6B. FIG. 6A depicts the change of polarization of light incident on the liquid crystal display at an angle of 60° leftwise for each of R, G and B and FIG. 6B depicts the change of polarization of light incident on the liquid crystal display at an angle of 60° rightwise for each of R, G and B. In these diagrams, the polarization of incident R light is shown by IR, the polarization of incident G light is shown by IG, and the polarization of incident B light is shown by IB. Calculation was made on the assumption that the optical films 113 and 13 show Re/Rth (450 nm) at a wavelength of 450 nm of 0.17, Re/Rth (550 nm) at a wavelength of 550 nm of 0.28, Re/Rth (650 nm) at a wavelength of 650 nm of 0.39 and Rth at a wavelength of 550 nm of 160 nm. It is assumed that Re of the optically anisotropic layers 5 and 9 are the same as on Poincare sphere shown in FIG. 5.

As shown in FIGS. 6A and 6B, R, G and B light beams incident leftwise and rightwise show polarization change represented by the position in the vicinity of S1 (=0) and the position deviated reflecting the wavelength dependence of Re/Rth of the optical film 113a after passing through the optical films 113a and 13a. This deviation makes it possible to cancel the deviation of polarization state caused by the wavelength dispersion of the optically anisotropic layers 9 and 5, and the liquid crystal layer 7, due to R-light, G-light and B-light. As a result, light beam incident leftwise or rightwise can reach the same final transition point regardless of wavelength. Accordingly, the leftwise and rightwise light leakage in black display and the color difference between left and right can be eliminated at the same time.

In the invention, the leftwise and rightwise light leakage in black display and the color difference between left and right can be eliminated by using a cellulose acylate film the optical properties of which are arranged such that the wavelength dispersion of retardation differs from light incident in the direction of normal line to light incident in oblique direction, e.g., at a polar angle of 60° and making the positive use of the optical properties of the optical film in optical compensation, So far as this principle is utilized, the scope of the invention is not limited by the display mode of liquid crystal layer. Thus, the invention can be applied also to liquid crystal displays having any display mode of liquid crystal layer such as VA mode, IPS mode, ECB mode and TN mode.

The liquid crystal display of the invention is not limited to the configuration shown in FIG. 1 and may comprise other members. For example, a color filter may be provided interposed between the liquid crystal cell and the polarizer. In the case where the liquid crystal display of the invention is used as a transmission type liquid crystal display, a back light having a cold cathode tube, hot cathode tube, light-emitting diode, field emission element or electroluminescent element may be provided on the back side thereof.

Examples of the liquid crystal display of the invention include image direct-viewing type, image projecting type and optical modulation type liquid crystal displays. The invention is particularly advantageous when applied to active matrix liquid crystal displays comprising three or two terminal semiconductor element such as TFT and MIM. Of course, the invention is also advantageous when applied to passive matrix liquid crystal displays such as STN type liquid crystal display called time-shared driving.

The optical film embodying this optical compensation will be further described hereinafter.

The optical film of the invention is not specifically limited so far as it is a transparent film. The optical film of the invention may be a stretched polymer film or may be a combination of a coated polymer layer and a polymer film. As the polymer film material there may be normally used a synthetic polymer (e.g., polycarbonate, polysulfone, polyether sulfone, polyacrylate, polymethacrylate, norbornene resin, triacetyl cellulose).

Figure 7:
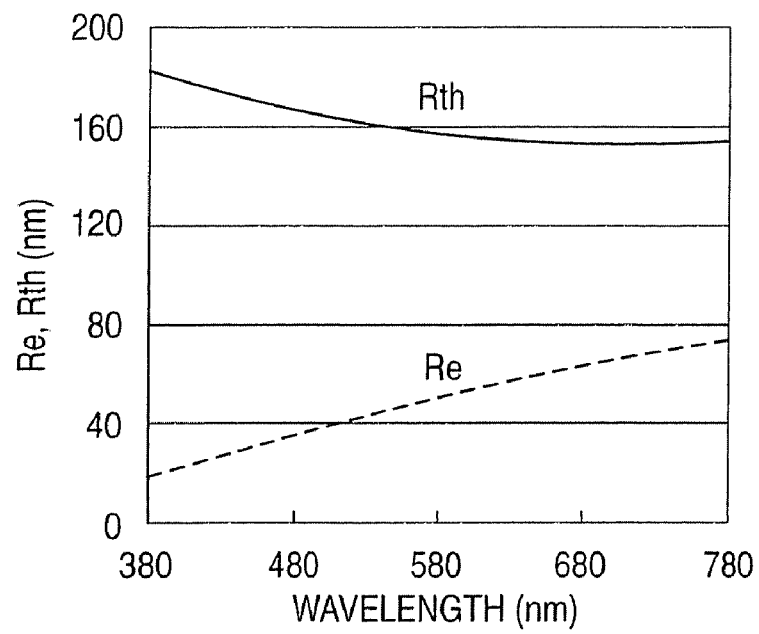
FIG. 7 is a diagram illustrating an example of the change of the retardation value Re and retardation value Rth at a wavelength of λ of an optical film of the invention.

A1 value of the optical film of the invention defined by the following equation (1) is preferably from 0.10 to 0.95, more preferably from 0.3 to 0.8, most preferably from 0.5 to 0.75. A2 value of the optical film of the invention defined by the following equation (2) is preferably from 1.01 to 1.50, more preferably from 1.10 to 1.45, most preferably from 1.20 to 1.40. (See Re in FIG. 7.)

$$A1 \text{ value} = Re(450)/Re(550) \tag{1}$$

$$A2 \text{ value} = Re(650)/Re(550) \tag{2}$$

wherein Re (450) represents the retardation value of the film with respect to light having a wavelength of 450 nm; Re (550) represents the retardation value of the film with respect to light having a wavelength of 550 nm; Re (650) is the retardation value in the thickness direction of film with respect to light having a wavelength of 650 nm.

The absolute value of Re is preferably controlled within a desired range depending on the embodiment of various liquid crystal layers. For example, in the case of OCB mode and VA mode, the absolute value of Re are each from 20 nm to 110 nm, preferably from 20 nm to 70 nm, more preferably from 35 nm to 70 nm.

As a method for controlling Re of the optical film of the invention there is preferably used a method which comprises stretching the transparent polymer film at a temperature of from 25° C. higher than the glass transition point of the polymer to 100° C. higher than the glass transition point of the polymer, i.e., from (Tg+25° C.) to (Tg+100° C.) supposing that the glass transition point of the polymer is Tg.

On the other hand, the transmission of the optical film is preferably 85% or more, more preferably 90% or more. The use of the stretching method of the invention makes it possible to obtain an optical film having a higher transmission even if the same material is used. The inventors presume that when the polymer material is stretched at a very high temperature, impurities in the polymer material are evaporated to eliminate factors that can be scattered in the film.

The mechanism of high temperature stretching resulting in the provision of Re at various wavelength ranges will be further described hereinafter with reference to cellulose acylate as most desirable embodiment.

A cellulose acylate comprises a main chain comprising a glucopyranose ring and a side chain comprising an acyl group. When a film made of cellulose acylate is stretched, the main chain is aligned in the stretching direction to develop Re. As a result of extensive studies, the inventors found that when such a film is stretched at a temperature as very high as 165° C. to 240° C. (Tg of the cellulose acylate used is 140° C.), Re at 450 nm is dropped and Re at 650 nm is raised.

The cellulose acylate film which has thus been stretched at high temperature shows an X-ray diffraction peak presumably attributed to crystallization. The X-ray diffraction peak is a peak in an X-ray diffraction pattern observed by X-ray diffraction measurement, in which X-ray scattering intensities of the measured substance in the vertical axis were plotted against each diffraction angle (2θ) in the horizontal axis. The peak observed in X-ray diffraction pattern of the cellulose acylate film before stretched is a broad peak. In contrast, with respect to the cellulose acylate film after stretched at high temperature, a sharp peak in comparison with the broad peak of the film before stretched is observed in the X-ray diffraction pattern. It is thus presumed that crystallization causes the change of alignment of main chain and side chains resulting in the change of wavelength dependence of Re.

In other words, crystallization is an important factor for the realization of the optical film of the invention. The degree of alignment P of the main chain defined by the following equation (3) calculated from X-ray diffractometry of the stretched film is preferably from 0.04 to 0.30, more preferably from 0.06 to 0.25.

$$P = <\cos^2 \beta >/2 \tag{3}$$

wherein $<\cos^2 \beta>$ represents $\int(0, \pi)\cos^2 \beta I (\beta) \sin \beta d\beta / \int(0, \pi) I(\beta) \sin \beta d\beta$ in which β is the angle of the surface on which X-rays are incident with respect to one direction in the film plane and I is the diffraction intensity at 2θ (=8°) on X-ray diffraction chart measured at angle β.

The degree of alignment (alignment order parameter) P of the surface of the film can be calculated by the aforementioned equation (3) from the peak intensity at $2\theta_\chi/\Phi$ ($=6°$ to 11°) detected with the X-ray detector and the sample being rotated at angle of $2\theta_\chi$ and $\Phi$ using a thin film X-ray In-Plain method.

On the other hand, in order to eliminate color difference in a liquid crystal display, it is also important to control Rth.

The optical film of the invention is preferably arranged such that B1 value defined by the following equation (4) is from 0.40 to 0.95, B2 value defined by the following equation (5) is from 1.05 to 1.93 and Rth (550) is from 70 nm to 400 nm. (See FIG. 7.)

$$B1 \text{ value} = \{Re(450)/Rth(450)\}/\{Re(550)/Rth(550)\} \quad (4)$$

$$B2 \text{ value} = \{Re(650)/Rth(650)\}/\{Re(550)/Rth(550)\} \quad (5)$$

wherein Re ($\lambda$) represents the retardation value of the film with respect to light having a wavelength of $\lambda$ nm; and Rth ($\lambda$) is the retardation value in the thickness direction of film with respect to light having a wavelength of $\lambda$ nm.

In other words, the ratio Re/Rth (450 nm) of Re to Rth at a wavelength of 450 nm in the visible light range is preferably from 0.40 to 0.95 times, more preferably from 0.4 to 0.8 times, even more preferably from 0.5 to 0.7 times Re/Rth (550 nm) at a wavelength of 550 nm. Further, Re/Rth (650 nm) at a wavelength of 650 nm is preferably from 1.05 to 1.93 times, more preferably from 1.1 to 1.7 times, even more preferably from 1.3 to 1.6 times Re/Rth (550 nm). Moreover, Rth at a wavelength of 550 nm is preferably from 70 nm to 400 nm. Re/Rth at R, G and B each are preferably from 0.1 to 0.8.

The thickness-direction retardation (Rth) of the entire optical film acts to cancel the thickness-direction retardation of the liquid crystal in black display. Accordingly, the preferred range of the thickness-direction retardation (Rth) of the entire optical film depends the embodiment of the various liquid crystal layers. For example, in the case where the optical film is used for optical compensation of OCB mode liquid crystal cell (OCB mode liquid crystal cell comprising a liquid crystal layer having a product $\Delta n \cdot d$ (thickness d (μm)×refractive anisotropy $\Delta n$) of from 0.2 to 1.5), the thickness-direction retardation (Rth) of the entire optical film is preferably from 70 nm to 400 nm, more preferably from 100 nm to 400 nm, even more preferably from 130 nm to 200 nm.

As a method for controlling Rth there is preferably used a method described later involving the spread of a liquid crystal layer or a method involving the use of additives.

The invention will be further described hereinafter.

(Cellulose Acylate)

As the raw cotton material of cellulose acylate there may be used any known raw material (see, e.g., Kokai Giho No. 2001-1745, Japan Institute of Invention and Innovation). The synthesis of cellulose acylate can be carried out by any known method (see, e.g., Migita et al, "Mokuzai Kagaku (Wood Chemistry)", Kyoritsu Shuppan, pp. 180-190, 1968). The viscosity-average polymerization degree of cellulose acylate is preferably from 200 to 700, more preferably from 250 to 500, most preferably from 250 to 350. Further, the cellulose ester to be used in the invention preferably has a sharp distribution of molecular weight Mw/Mn (Mw: weight-average molecular weight; Mn: number-average molecular weight) determined by gel permeation chromatography. In some detail, Mw/Mn is preferably from 1.5 to 5.0, more preferably from 2.0 to 4.5, most preferably from 3.0 to 4.0.

The acyl group in the cellulose acylate film is not specifically limited but is preferably an acetyl group or propionyl group, particularly preferably acetyl group. The degree of substitution of all acyl groups is preferably from 2.7 to 3.0, more preferably from 2.8 to 2.95. The term "degree of substitution of acyl groups" as used herein is meant to indicate value calculated according to ASTM D817. The acyl group is most preferably an acetyl group. In the case where a cellulose acetate comprising an acetyl group as an acyl group is used, the percent acetylation is preferably from 57.0% to 62.5%, more preferably from 58.0% to 62.0%. When the percent acetylation falls within this range, Re can be prevented from rising above the desired value due to conveyance tension during casting. Further, there occurs little dispersion of in-plane retardation Re. Moreover, there occurs little change of retardation value with temperature and humidity.

In particular, supposing that the cellulose acylate film is obtained by substituting the hydroxyl group in glucose units constituting cellulose by an acyl group having two or more carbon atoms, the degree of substitution of 2-position hydroxyl group in glucose units by acyl group is DS2, the degree of substitution of 3-position hydroxyl group in glucose units by acyl group is DS3 and the degree of substitution of 6-position hydroxyl group in glucose units by acyl group is DS6, when the following relationships (I) and (II) are satisfied, the change of Re value with temperature and humidity can be further reduced to advantage:

$$2.0 \leq DS2 + DS3 + DS6 \leq 3.0 \quad (I)$$

$$DS6/(DS2 + DS3 + DS6) \geq 0.315 \quad (II)$$

(Stretching)

The cellulose acylate film of the invention performs its function when stretched.

A preferred stretching method of the invention will be described in detail below.

The cellulose acylate film of the invention is preferably stretched crosswise so that it can be used as a polarizing plate. For details, reference can be made to JP-A-62-115035, JP-A-4-152125, JP-A-4-284211, JP-A-4-298310 and JP-A-11-48271. The stretching of the film is effected at a temperature of from 25° C. higher than the glass transition point Tg to 100° C. higher than the glass transition point Tg. The film may be subjected to monoaxial stretching or biaxial stretching. The film can be stretched by some treatment during drying. This treatment is effective particularly when the solvent remains in the film. For example, by adjusting the speed of the film conveying rollers such that the film winding speed is higher than the film peeling speed, the film can be stretched. The film can be stretched also by conveying the film with the width thereof being kept by a tenter while gradually expanding the width of the tenter. The film dried may be stretched also by means of a stretching machine (preferably monoaxial stretching using a longitudinal stretching machine). The draw ratio of the film (percent increase from original length due to stretching) is preferably from 0.5% to 300%, more preferably from 1% to 200%, particularly preferably from 1% to 100%. The cellulose acylate film of the invention is preferably produced by successively or continuously effecting a film-forming step involving solvent casting method and a step of stretching the film thus prepared. The draw ratio is preferably from not smaller than 1.2 to not greater than 1.8. Stretching may be effected by a single stage or by multiple stages. In the case where stretching is effected by multiple stages, it suffices if the product of the various draw ratios falls within the above defined range.

The stretching speed is preferably from 5%/min to 1,000%/min, more preferably from 10%/min to 500%/min. The stretching temperature is preferably from 30° C. to 160° C., more preferably from 70° C. to 150° C., particularly preferably from 85° C. to 150° C. Stretching is preferably effected over a heated roller and/or by a heat from a radiation heat source (e.g., IR heater) or with hot air. Further, in order to enhance the temperature uniformity, a constant temperature tank may be provided. In the case where monoaxial stretching involves roll stretching, the ratio L/W of distance (L) between rollers to width (W) of retarder plate is preferably from 2.0 to 5.0.

A preheating step is preferably provided prior to the stretching step. The stretching step may be followed by a heat treatment step. The heat treatment is preferably effected at a temperature of from 20° C. lower than the glass transition temperature of cellulose acylate film to 10° C. higher than the glass transition temperature of cellulose acylate film. The heat treatment is preferably effected for 1 second to 3 minutes. The heating method may involve zone heating or partial heating using an infrared heater. The film may be slit at the both edges thereof during or at the end of the heat treatment step. Slit tailing is preferably recovered for recycling. Referring to tenter, JP-A-11-077718 proposes that the drying of the web with its width retained by a tenter be effected by properly controlling the drying gas blowing method, the blowing angle, the wind velocity distribution, the wind velocity, the air flow rate, the temperature difference, the upper to lower air flow rate ratio, the use of high specific heat drying gas, etc. so that the speed of solution casting method can be raised or the prevention of deterioration of quality such as planarity during the expansion of web width can be assured.

Further, JP-A-11-077822 discloses an invention involving heat treatment with heat gradient in the crosswise direction of film at a step of heat relaxation of a thermoplastic resin stretched at a stretching step for the purpose of preventing the occurrence of unevenness.

Moreover, JP-A-4-204503 discloses an invention involving the stretching of a film with its solvent content kept at a range of from 2% to 10% as calculated in terms of solid content for the purpose of preventing the occurrence of unevenness.

Further, JP-A-2002-248680 discloses an invention which comprises stretching a film at a tenter clipping width D kept below (33/(log(draw ratio)×log(volatile content))) so that curling due to limitation of clipping width can be suppressed to facilitate the conveyance of the film after stretching step.

Moreover, JP-A-2002-337224 discloses an invention involving tenter conveyance with pin in the former half stage and with clip in the latter half stage for the purpose of attaining both high speed soft film conveyance and stretching.

Further, JP-A-2002-187960 discloses an invention which comprises casting a cellulose ester dope solution over a casting support, and then stretching the web (film) peeled off the casting support at a draw ratio of from 1.0 to 4.0 in at least one direction while the residual solvent content in the web is 100% by weight or less, particularly from 10 to 100% by weight so that the resulting film has an optical biaxiality for the purpose of simply improving the viewing angle properties and the viewing angle. In a preferred embodiment disclosed, the web is stretched at a draw ratio of from 10 to 4.0 in at least one direction while the residual solvent content in the web is 100% by weight or less, particularly from 10 to 100% by weight. Other examples of stretching method include a method which comprises making the peripheral speed of a plurality of rollers different so that the film is longitudinally stretched by the use of difference in peripheral speed between rollers, a method which comprises stretching the web fixed at both edges with clips or pins the interval of which expands in the moving direction so that the web is longitudinally stretched, a method which comprises stretching the web fixed at both edges which move outward crosswise so that the web is crosswise stretched, a method which comprises stretching the web fixed at both edges which move outward crosswise and longitudinally so that the web is crosswise and longitudinally stretched, and combination thereof. It is also disclosed that in the case of tenter method, when the clipping portion is driven by a linear driving process, smooth stretching can be effected, making it possible to eliminate risk such as break to advantage.

Moreover, JP-A-2003-014933 discloses an invention which comprises preparing a dope A containing a resin, additives and an organic solvent and a dope B containing a resin and additives free of or having less amount of additives, cocasting the dope A and the dope B over a support in such a manner that the dope A forms a core layer and the dope B forms a surface layer, vaporizing the organic solvent until the web can be peeled off the support, peeling the web off the support, and then stretching the web at a draw ratio of from 1.1 to 1.3 in at least one direction while the residual solvent content in the resin film during stretching is from 3 to 50% by weight to prepare a retarder film having little additive bleedout, no interlayer exfoliation, good slipperiness and excellent transparency. In a preferred embodiment, the web is peeled off the support, and then stretched at a draw ratio of from 1.1 to 3.0 and a temperature of from 140° C. to 200° C. in at least one axial direction. In a further preferred embodiment, a dope A containing a resin and an organic solvent and a dope B containing a resin, a particulate material and an organic solvent are prepared. The dope A and the dope B are then cocasted over a support in such a manner that the dope A forms a core layer and the dope B forms a surface layer. The organic solvent is then vaporized until the web can be peeled off the support. The web is peeled off the support, and then stretched at a draw ratio of from 1.1 to 3.0 in at least one axial direction while the residual solvent content in the resin film during stretching is from 3 to 50% by weight. In a further preferred embodiment, the web is stretched at a draw ratio of from 1.1 to 3.0 and a temperature of from 140° C. to 200° C. in at least one axial direction. In a further preferred embodiment, a dope A containing a resin, an organic solvent and additives, a dope B containing a resin and additives free of or having less amount of additives and a dope C containing a resin, a particulate material and an organic solvent are prepared. The dope A, the dope B and the dope C are then cocasted over a support in such a manner that the dope A forms a core layer, the dope B forms a surface layer and the dope C forms the other side surface layer. The organic solvent is then vaporized until the web can be peeled off the support. The web is then peeled of the support, and then stretched at a draw ratio of from 1.1 to 3.0 in at least one axial direction while the residual solvent content in the resin film during stretching is from 3 to 50% by weight. In a further preferred embodiment, the web is stretched at a draw ratio of from 1.1 to 3.0 and a temperature of from 140° C. to 200° C. in at least one axial direction. In a further preferred embodiment, the content of the additives to be incorporated in the dope A and the dope B are from 1 to 30% by weight and from 0 to 5% by weight based on the weight of the resin, respectively, the additives are plasticizers, ultraviolet absorbers or retardation controllers and methylene chloride or methyl acetate is incorporated as an organic solvent in the dope A and the dope B in an amount of 50% by or more.

Moreover, JP-A-2003-014933 discloses that as the stretching method there is preferably used a method involving the use of a crosswise stretching machine called tenter adapted to crosswise stretch the web fixed at both edges thereof with a clip or pin the distance of which expands crosswise. It is also disclosed that the longitudinal stretching or shrinkage is carried out by using a simultaneous biaxial stretching machine comprising pins or clips the interval of which increases or decreases in the conveying direction (longitudinal direction). It is further disclosed that when the clipping portion is driven by a linear driving process, stretching can be smoothly effected, making it possible to eliminate risk such as break to advantage. It is further disclosed that as the longitudinal stretching method there may be also used a method which makes the peripheral speed of a plurality of rollers different so that the film is longitudinally stretched by the use of difference in peripheral speed between rollers. It is further disclosed that these stretching methods may be used in composite. It is further disclosed that the stretching step may be effected batchwise in two or more stages as hi longitudinal stretching-crosswise stretching-longitudinal stretching or longitudinal stretching-longitudinal stretching.

Moreover, JP-A-2003-004374 discloses an invention involving the use of a drying apparatus comprising a dryer the width of which is shorter than that of the web so that the hot air from the dryer does not hit the both edges of the web to prevent the foaming of the web during tenter drying, improve the releasability of the web and prevent the production of dust.

Further, JP-A-2003-019757 discloses an invention involving the provision of a windshield inside the both edges of the web such that drying air does not hit the tenter retaining portion to prevent the foaming of the web during tenter drying, improve the releasability of the web and prevent the production of dust.

Moreover, JP-A-2003-053749 discloses an invention that satisfies the relationships (1) $40 \leq X \leq 200$ when T is 60 or less, (2) $40+(T-60) \times 0.2 \leq X \leq 300$ when T is from more than 60 to not more than 120 and (3) $52+(T-120) \times 0.2 \leq X \leq 400$ when T is more than 120 supposing that the dried thickness of the both edges of the film retained by the pin tenter is X μm and the average dried thickness of the product portion of the film is T μm to perform stable conveyance and drying.

Further, JP-A-2-182654 discloses an invention involving the provision of a heating chamber and a cooling chamber in the dryer of a multi-stage tenter in the tenter device such that the right and left clip chains are separately cooled to prevent the multi-stage tenter from causing wrinkle.

Moreover, JP-A-9-077315 discloses an invention involving the use of a pin tenter having inner pins having a great density and outer pins having a small density such that break, wrinkle and malconveyance of the web can be prevented.

Further, JP-A-9-085846 discloses an invention involving the use of a tenter drying apparatus arranged such that the pin for retaining the both edges of the web is cooled to a temperature of less than the foaming temperature of the web by a blowing cooler and the pin is cooled to a temperature of the gelation temperature of the dope in the duct type cooler plus 15° C. shortly before engaging the web to prevent the web from foaming or attaching to the retaining unit in the tenter.

Moreover, JP-A-2003-103542 discloses an invention concerning a solution film-forming method which comprises cooling an insert structure in a pin tenter so that the surface temperature of the web does not exceed the gelation temperature of the web to prevent pin tenter slip and eliminate foreign matters.

Further, JP-A-11-077718 discloses an invention involving the use of a tenter web drying method performing at a wind velocity of from 0.5 to 20 (40) m/s, a crosswise temperature distribution of 10% or less, an upper to lower web air flow ratio of from 0.2 to 1 and a drying gas ratio of from 30 to 250 J/Kmol to raise the speed of solution casting method and prevent the deterioration of quality such as planarity during the expansion of web width by tenter. Preferred tenter drying conditions are disclosed depending on the residual solvent content. In some detail, the angle of blowing from the blowing nozzle is predetermined to be from 30° to 150° between the time at which the web is peeled off the support and the time at which the residual solvent content in the web reaches 4% by weight. When the wind velocity distribution on the surface of the film positioned in the extending direction of blowing of drying gas is based on the upper limit of wind velocity, the difference between the upper limit and the lower limit is predetermined to be 20% or less during the blowing of drying gas. When the residual solvent content in the web is from not smaller than 130% by weight to not greater than 70% by weight, the wind velocity of drying gas blown from the blowing drying machine on the surface of the web is predetermined to be not smaller than 0.5 m/sec to not greater than 20 m/sec. When the residual solvent content is from not smaller than 4% by weight to less than 70%, the web is dried with a drying gas wind blown at a rate of from not smaller than 0.5 m/sec to not greater than 40 m/sec. When the temperature distribution of drying gas in the crosswise direction of web is based on the upper limit of the gas temperature, the difference between the upper limit and the lower limit is predetermined to be 10% or less. When the residual solvent content in the web is not smaller than 4% by weight to not greater than 200% by weight, the flow rate ratio q of drying gas blown from the blowing nozzle of the blowing drying machines positioned above and under the web which is being conveyed is predetermined to be from not smaller than 0.2 to not greater than 1. In a further embodiment, as a drying gas there is used at least one gas the average specific heat of which is from not smaller than 31.0 J/K·mol to not greater than 250 J/K·mol. A drying gas containing an organic compound which normally stays liquid in a concentration of 50% or less may be used at saturated vapor pressure.

Moreover, JP-A-11-077719 discloses an invention involving the use of a TAC producing apparatus comprising a tenter clip having a heating portion incorporated therein such that the planarity or spreadability cannot be impaired by the production of contaminants. In a preferred embodiment, a device for removing foreign matters generated on the portion of contact of clip with web is provided between the site at which the clip of the tenter releases the web and the site at which the clip carries the web again. The foreign matters are removed by the use of spraying gas or liquid or a brush. The residual amount of the web during the contact of the clip or pin with the web is from not smaller than 12% by weight to not greater than 50% by weight. The surface temperature of the portion of contact of the clip or pin with the web is preferably not smaller than 60° to not greater than 200° (more preferably not smaller than 80° to not greater than 120°).

Further, JP-A-11-090943 discloses an invention involving the use of a tenter clip having Lr of from not smaller than 1.0 to not greater than 1.99 supposing that Lr is the ratio Ltt/Lt of the arbitrary length Lt (m) of the tenter to the sum Ltt (m) of the conveying length of the portions at which the tenter clip having the same length as Lt retains the web to improve planarity, eliminate quality deterioration due to tear in the tenter and raise the productivity. In a preferred embodiment, the portions at which the web is retained are disposed without any gap as viewed crosswise.

Moreover, JP-A-11-090944 discloses an invention a plastic film producing apparatus comprising a web crosswise slack inhibiting device provided before the inlet of tenter to eliminate the deterioration of planarity and the instability of introduction due to slacking of web during the introduction of web into the tenter. In a preferred embodiment, the slack inhibiting device is a rotary roller which rotates at a crosswise expanding angle of from 2° to 60°. An air sucking device is provided above the web. There is also provided an air blower capable of blowing from the web.

JP-A-11-090945 discloses an invention concerning a TAC producing method which comprises introducing a web which has been peeled off the support at an angle with respect to the horizontal direction for the purpose of preventing the occurrence of slacking that deteriorates quality and impairs productivity.

Further, JP-A-2000-289903 discloses an invention concerning a conveying apparatus arranged to convey the web while tensing the web in the crosswise direction at the time when the web is peeled off and has a solvent content of from 12% to 50% by weight wherein there are provided a web width detecting unit, a web retaining unit and two or more variable flexing points and a web width is calculated from signal produced by the web width detecting unit to change the position of the flexing points, thereby preparing a film having stabilized physical properties.

JP-A-2003-033933 proposes that a guide plate for preventing the occurrence of curling of web at the edge thereof is provided at least above and under the right and left edges of the web at both right and left sides of the portion close to the inlet of the tenter and the surface of the guide plate opposed to the web includes a resin portion in contact with web and a metallic portion in contact with web arranged in the web conveying direction to enhance clipping properties and prevent web break over an extended period of time. In a preferred embodiment, the resin portion in contact with web on the guide plate opposed to the web is disposed upstream in the web conveying and the metallic portion in contact with web is disposed downstream in the web conveying direction. The step between the resin portion in contact with web and the metallic portion in contact with web of the guide plate (including slope) is 500 μm or less. The distance of the resin portion and the metallic portion of the guide plate in contact with web in the web width direction are each from 2 to 150 mm. The distance of the resin portion and the metallic portion of the guide plate in contact with web in the web conveying direction are each from 5 mm to 120 mm. The resin portion in contact with web of the guide plate is provided by working the surface of a metallic guide substrate with a resin or spreading a resin over the metallic guide substrate. The resin portion in contact with web of the guide plate includes simple resin body. The distance between the web opposing surfaces of guide plates disposed upward and downward at the right and left edges of web is from 3 to 30 mm. The distance between the opposing upper and lower guide plates at the right and left edges of the web increases crosswise and inward at a rate of 2 mm or more per 100 mm of width. Both the upper and lower guide plates at the right and left edges of the web each have a length of from 10 mm to 300 mm. The upper and lower guide plates are disposed shifted in the conveying direction. The shift between the upper and lower guide plates is from −200 to +200 mm. The surface of the upper guide plate opposed to the web includes resin or metal alone. The surface of the resin portion of the upper guide plate opposed to the web is made of Teflon®. The metallic portion in contact with web is made of stainless steel. The surface roughness of the guide plate opposed to the web or the resin portion and/or metallic portion in contact with web is 3 μm or less. It is preferred that the upper and lower guide plates for preventing the occurrence of curling of the web on the edges thereof be disposed in between the end of the support at which the web is peeled off and the site at which the web is introduced into the tenter, more preferably close to the inlet of the tenter.

JP-A-11-048271 discloses an invention which comprises stretching the web which has been peeled off using a stretching device at the time when the solvent content in the web is from 12% to 50% by weight, drying the web, and then pressing the web at a pressure of from 0.2 to 10 KPa on the both sides thereof using a press at the time when the solvent content in the web is 10% by weight or less to prevent the web from undergoing break or unevenness during drying in the tenter. In a preferred embodiment, the tensing of the web is terminated at the time when the solvent content in the web is 4% by weight or more. In the case where a nip roll is used to press the web (film) on the both sides thereof, one to eight pairs of nip rolls are preferably used. The temperature at which pressing is effected is preferably from 100° C. to 200° C.

Moreover, JP-A-2002-036266, which invention relates to the provision of a high quality thin cellulose acylate film having a thickness of from 20 μm to 85 μm, discloses that the tension difference which acts on the web along the conveying direction is predetermined to be 8 N/mm$^2$ or less. It is also disclosed that the peeling step is followed by a preheating step for preheating the web which is followed by a stretching step for stretching the web using a tenter which is followed by a relaxing step for relaxing the web by the amount less than the stretching at the stretching step. It is further disclosed that the temperature T1 at the preheating step and the stretching step is predetermined to be not lower than (glass transition temperature Tg of film −60° C.), the temperature T2 at the relaxing step is predetermined to be not higher than (T1−10° C.), the draw ratio of the web at the stretching step is predetermined to be from 0% to 30% as calculated in terms of ratio to the width of the web shortly before the stretching step and the draw ratio of the web at the relaxing step is predetermined to be from −10 to 10%.

Moreover, JP-A-2002-225054, which is intended to reduce the dried thickness of the web to a range of from 10 μm to 60 μm, reduce the weight of the web and attain excellence in durability such as moisture permeability, discloses that the web which has been peeled off the support is gripped by a clip at the edges thereof by the time at which the residual solvent content in the web reaches 10% by weight so that the width of the web can be kept constant to suppress the drying shrinkage and/or crosswise stretched to form a film having a planar alignment (S) of from 0.0008 to 0.0020 as represented by the equation S={(Nx+Ny)/2}−Nz (in which Nx represents the refractive index of the film in the in-plane direction along which the highest refractive index is exhibited, Ny represents the refractive index in the in-plane direction perpendicular to Nx and Nz represents the refractive index of the film in the thickness direction). It is also disclosed that the time between casting and peeling is predetermined to be from 30 seconds to 90 seconds. It is further disclosed that the web which has been peeled off the support is stretched crosswise and/or longitudinally.

Moreover, JP-A-2002-341144 discloses a solution film-forming method involving a stretching step wherein the weight concentration of the retardation raising agent has a higher optical distribution toward the center of the width of the film to suppress optical unevenness.

Further, JP-A-2003-071863, which invention is indented to obtain a film which undergoes no clouding, discloses that the crosswise draw ratio is preferably from 0% to 100%, and more preferably from 5% to 20%, most preferably from 8% to 15% if the web is used as a polarizing plate protective film. It is also disclosed that if the web is used as a retarder film, the crosswise draw ratio is more preferably from 10% to 40%, most preferably from 20% to 30%. It is further disclosed that Ro can be controlled by draw ratio and the higher the draw ratio is, the more excellent is the planarity of the resulting film. It is further disclosed that the residual solvent content in the film to be processed by a tenter is preferably from 20% to 100% by weight at the beginning of tenter process. It is further disclosed that the film is preferably dried while being tensed until the residual solvent content in the film reaches 10% by weight or less, more preferably 5% by weight or less. It is further disclosed that the drying temperature, if tenter process is effected, is preferably from 30° C. to 150° C., more preferably from 50° C. to 120° C., most preferably from 70° C. to 100° C. It is also disclosed that the lower the drying temperature is, the less is evaporation of plasticizer or the like and process contamination while the higher the drying temperature is, the better is the planarity of the film.

JP-A-2002-248639, which invention is intended to reduce the longitudinal and crosswise dimensional change during storage under high temperature and humidity conditions, discloses a film producing method which comprises casting a cellulose ester solution over a support, and then continuously peeling and drying the film wherein drying is effected such that the percent driving shrinkage satisfies the relationship 0≦% drying shrinkage≦0.1×% residual solvent content during peeling. In a preferred embodiment, while the residual solvent content in the cellulose ester film peeled is from 40% to 100% by weight, the cellulose ester film is tenter-conveyed with the both edges thereof gripped to reduce the residual solvent content by 30% by weight or more. The residual solvent content in the cellulose ester film peeled is from 40% to 100% by weight and from 4% to 20% by weight at the inlet and outlet of the tenter conveyor, respectively. The tension with which the cellulose ester film is tenter-conveyed increases from the inlet of the tenter conveyor to the outlet of the tenter conveyor. The tension with which the cellulose ester film is tenter-conveyed is substantially the same as the crosswise tension of the cellulose ester film.

Further, JP-A-2000-239403 proposes that film forming is effected such that the relationship between the residual solvent content X during peeling and the residual solvent content Y during introduction into tenter satisfies the expression $0.3X \leq Y \leq 0.9X$ to obtain a film having a small thickness excellent in optical isotropy and planarity.

JP-A-2002-286933 exemplifies a method involving stretching under heating conditions and a method involving stretching with a solvent incorporated in the film as a method for stretching a film formed by casting. It is also disclosed that the stretching under heating conditions is preferably effected at a temperature of not higher than the value in the vicinity of the glass transition point of the resin while the stretching with the cast-formed film impregnated with a solvent may be effected by drying the film, bringing the film into contact with a solvent so that the film is impregnated with the solvent, and then stretching the film.

(Method for Controlling Re; Retardation Raising Agent Having a Maximum Absorption Wavelength (λmax) Shorter than 250 nm)

In order to control the absolute value of Re of the optical film of the invention, a compound having a maximum absorption wavelength (λmax) shorter than 250 nm in solution ultraviolet absorption spectrum is preferably used as a retardation raising agent. The use of such a compound makes it possible to control the absolute value of Re of the optical film of the invention without substantially changing the wavelength dependence of Re in the visible light range.

The term "retardation raising agent" as used herein is meant to indicate an "additive" which provides an unstretched cellulose acylate film with an Re retardation rise of 20 nm or more as measured at a wavelength of 550 nm from that of an unstretched cellulose acylate film prepared in the same manner except that the additive is not added. The rise of retardation value is preferably 30 nm or more, more preferably 40 nm or more, most preferably 60 nm or more.

From the standpoint of function of retardation raising agent, a rod-shaped compound is preferably used. More preferably, the rod-shaped compound has at least one aromatic ring, even more preferably at least two aromatic rings.

The rod-shaped compound preferably has a linear molecular structure. The term "linear molecular structure" as used herein is meant to indicate that the molecular structure of the rod-shaped compound which is most thermodynamically stable is linear. The most thermodynamically stable structure can be determined by crystallographic structure analysis or molecular orbital calculation. For example, a molecular orbital calculation software (ego, WinMOPAC2000, produced by Fujitsu Co., Ltd.) may be used to effect molecular orbital calculation, making it possible to determine a molecular structure allowing the minimization of heat formation of compound. The term "linear molecular structure" as used herein also means that the most thermodynamically stable molecular structure thus calculated forms a main chain at an angle of 140 degrees or more.

The rod-shaped compound preferably exhibits liquid crystal properties. More preferably, the rod-shaped compound exhibits liquid crystal properties when heated (thermotropic liquid crystal properties). The liquid crystal phase is preferably a nematic phase or smectic phase.

Preferred examples of the rod-shaped compound include those disclosed in JP-A-2004-4550 but the invention is not limited thereto. Two or more rod-shaped compounds having a maximum absorption wavelength (λmax) shorter than 250 nm in solution ultraviolet absorption spectrum may be used in combination.

The rod-shaped compound can be synthesized according to a method disclosed in references. Examples of these references include "Mol. Cryst, Liq. Cryst.", vol. 53, page 229 (1979), vol. 89, page 93 (1982), vol. 145, page 111 (1987), vol. 170, page 43 (1989), "J. Am. Chem. Soc.", vol. 113, page 1,349 (1991), vol. 118, page 5,346 (1996), vol. 92, page 1,582 (1970), "J. Org. Chem.", vol. 40, page 420 (1975), and "Tetrahedron", vol. 48, No. 16, page 3,437 (1992).

The added amount of the retardation raising agent is preferably from 0.1 to 30% by weight, more preferably from 0.5 to 20% by weight based on the amount of the polymer.

(Method for Controlling Rth; Retardation Raising Agent Having a Maximum Absorption Wavelength (λmax) Longer than 250 nm)

In order to develop the desired Rth retardation value, a retardation raising agent is preferably used.

The term "retardation raising agent" as used herein is meant to indicate an "additive" which provides an unstretched cellulose acylate film with an Rth retardation rise of 20 nm or more as measured at a wavelength of 550 nm from that of an unstretched cellulose acylate film prepared in the same manner except that the additive is not added. The rise of retardation value is preferably 30 nm or more, more preferably 40 nm or more, most preferably 60 nm or more.

The retardation raising agent is preferably a compound having at least two aromatic rings. The retardation raising agent is preferably used in an amount of from 0.01 to 20 parts by weight, more preferably from 0.1 to 10 parts by weight, even more preferably from 0.2 to 5 parts by weight, most preferably from 0.5 to 2 parts by weight based on 100 parts by weight of polymer. Two or more retardation raising agents may be used in combination.

The retardation raising agent preferably has an absorption maxima in the wavelength range of from 250 nm to 400 nm and substantially no absorption in the visible light range.

The retardation raising agent for controlling Rth preferably has no effect on Re, which is developed by stretching. As the retardation raising agent there is preferably used a disc-shaped compound.

The term "aromatic ring" as used herein is meant to include aromatic heterocycles in addition to aromatic hydrocarbon rings. The aromatic hydrocarbon ring is particularly preferably a 6-membered ring (i.e., benzene ring).

The aromatic heterocycle is normally an unsaturated heterocycle. The aromatic heterocycle is preferably a 5-, 6- or 7-membered ring, more preferably 5- or 6-membered ring. The aromatic heterocycle normally has the most numerous double bonds. Preferred examples of the hetero atom include nitrogen atom, oxygen atom, and sulfur atom. Particularly preferred among these hetero atoms is nitrogen atom. Examples of the aromatic heterocycle include furane ring, thiophene ring, pyrrole ring, oxazole ring, isooxazole ring, thiazole ring, isothiazole ring, imidazole ring, pyrazole ring, furazan ring, triazole ring, pyrane ring, pyridine ring, pyridazine ring, pyrimidine ring, pyrazine ring, and 1,3,5-triazine ring.

Preferred examples of the aromatic ring include benzene ring, furane ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. More specifically, compounds disclosed in JP-A-2001-166144 are preferably used.

The aromatic compound is used in an amount of from 0.01 to 20 parts by weight, preferably from 0.05 to 15 parts by weight, more preferably from 0.1 to 10 parts by weight based on 100 parts by weight of cellulose acylate. Two or more aromatic compounds may be used in combination.

(Method for Controlling Rth; Method by Optically Anisotropic Layer)

As a method for controlling Rth without affecting Re developed by stretching there is preferably used a method involving the spread of optically anisotropic layer such as liquid crystal layer.

Specific examples of Rth controlling method by liquid crystal layer include a method which comprises aligning a discotic liquid crystal such that the angle of the disc surface of the discotic liquid crystal with respect to the surface of the optical film is 5 degrees or less (JP-A-10-312166) and a method which comprises aligning a rod-shaped liquid crystal such that the angle of the major axis of the rod-shaped liquid crystal with respect to the surface of the optical film is 5 degrees or less (JP-A-2000-304932).

(Application to Optically Compensatory Film)

The optical film of the invention contributes to expand the viewing angle contrast of liquid crystal displays, particularly of OCB or VA mode, and eliminate color difference of these liquid crystal displays dependent on the viewing angle. The optically compensatory film of the invention may be disposed either or both in between the viewer side polarizing plate and liquid crystal cell and in between the back side polarizing plate and liquid crystal cell. For example, the optically compensatory film of the invention may be incorporated as an independent member in the interior of the liquid crystal display. Alternatively, the protective film for protecting the polarizer in the optically compensatory film may be provided with optical properties so that the optically compensatory film can act also as a transparent film that is incorporated in the interior of liquid crystal display as a member of the polarizing plate. The optically compensatory film of the invention has at least two layers, i.e., optical film of the invention and optically anisotropic layer having other optical properties. An alignment film for controlling the alignment of the liquid crystal compound in the optically anisotropic layer may be provided interposed between the cellulose acylate film and the optically anisotropic layer. The cellulose acylate film and the optically anisotropic layer each may consist of two or more layers so far as the optical properties described later can be satisfied. Firstly, the various constituent members of the optically compensatory film of the invention will be further described.

[Another Optically Anisotropic Layer]

The optical film of the invention has at least one optically anisotropic layer made of a liquid crystal compound depending on the liquid crystal system to which it is applied. The optically anisotropic layer may be formed on the surface of the optical film directly or with the interposition of an alignment film formed thereon. Alternatively, the optically compensatory film of the invention can be prepared by transferring a liquid crystal compound layer formed on a separate substrate onto the optical film with an adhesive.

Examples of the liquid crystal compound to be used in the formation of the optically anisotropic layer include rod-shaped liquid crystal compounds and disc-shaped liquid crystal compounds (hereinafter occasionally referred to as "discotic liquid crystal compound"). The rod-shaped liquid crystal compound and discotic liquid crystal compound may be a polymer liquid crystal or low molecular liquid crystal. The compound which is finally incorporated in the optically anisotropic layer no longer needs to show liquid crystal properties. For example, in the case where a low molecular liquid crystal compound is used to prepare the optically anisotropic layer, the compound may be crosslinked to show no liquid crystal properties at a step of forming the optically anisotropic layer.

(Rod-Shaped Liquid Crystal Compound)

Examples of the rod-shaped liquid crystal compound employable herein include azomethines, azoxys, cyanobiphenyls, cyanophenylesters, benzoic acid esters, cyclohexanecarboxylic acid phenyl esters, cyanophenyl cyclophexanes, cyano-substituted phenylpyrimidines, alkoxy-substituted phenylpyrimidines, phenyldioxanes, tolans, and alkenyl cyclohexylbenzonitriles. Examples of the rod-shaped liquid crystal compound include metal complexes. A liquid crystal polymer containing a rod-shaped liquid crystal compound in its repeating unit, too, may be used. In other words, the rod-shaped liquid crystal compound may be connected to a (liquid crystal) polymer.

For the details of rod-shaped liquid crystal compound, reference can be made to "Kikan Kagaku Sosetsu (Quarterly Review of Chemistry Quarterly Review of Chemistry)", vol. 22 (Chemistry of Liquid Crystal), 1994, Chapter 4, 7 and 11, The Chemical Society of Japan, and "Ekisho Debaisu Handobukku (Liquid Crystal Device Handbook)", Chapter 3, The Japan Society for the Promotion of Science, the 142nd committee meeting.

The birefringence of the rod-shaped liquid crystal compound to be used in the invention preferably falls within the range of from 0.001 to 0.7.

The rod-shaped liquid crystal compound preferably has a polymerizable group to fix its alignment. The polymerizable group is preferably an unsaturated polymerizable group or epoxy group, more preferably unsaturated polymerizable group, most preferably ethylenically unsaturated polymerizable group.

(Discotic Liquid Crystal Compound)

Examples of the discotic liquid crystal compound include benzene derivatives disclosed in C. Destrade et al's study report, "Mol. Cryst.", vol. 71, page 111 (1981), truxene derivatives disclosed in C. Destrade and et al's study report, "Mol. Cryst.", vol. 122, page 141 (1985), and "Physics lett", A, vol. 78, page 82 (1990), cyclohexane derivatives disclosed in B. Kohne et al's study report, "Angew, Chem.", vol. 96, page 70 (1984), and azacrown-based or phenyl acetylene-based macrocycles disclosed in J. M. Lehn et al's study report, "J. Chem. Commun.", page 1,794 (1985), J. Zhang et al's study report, "J. Am. Chem. Soc.", vol. 116, page 2,655 (1994).

Examples of the aforementioned discotic liquid crystal compounds include liquid crystal compounds comprising a nucleus disposed at the center of the molecule and straight-chain alkyl groups, alkoxy groups or substituted benzoyloxy groups disposed radially on the nucleus as side chains of the nucleus. The discotic liquid crystal compound is preferably a compound the molecules or molecule aggregate of which have a rotary symmetry and thus can be aligned as desired.

As mentioned above, in the case where the optically anisotropic layer is formed by a liquid crystal compound, the compound which is finally incorporated in the optically anisotropic layer no longer needs to show liquid crystal properties. For example, in the case where the low molecular discotic liquid crystal compound has a group which reacts when heated or irradiated with light so that when heated or irradiated with light, the resulting reaction of the group causes the low molecular discotic liquid crystal compound to undergo polymerization or crosslinking to form an optically anisotropic layer, the compound incorporated in the optically anisotropic layer may no longer maintain its liquid crystal properties. For the preferred examples of the discotic liquid crystal compounds, reference can be made to JP-A-8-50206. For the details of polymerization of discotic liquid crystal compound, reference can be made to JP-A-8-27284.

In order to fix the discotic liquid crystal compound by polymerization, it is necessary that polymerizable groups be connected to the disc-shaped core of the discotic liquid crystal compound as substituents. However, when polymerizable groups are directly connected to the disc-shaped core, it is difficult to keep the discotic liquid crystal molecules aligned as desired in the polymerization reaction. It is therefore preferred that connecting groups be incorporated in between the disc-shaped core and the polymerizable groups.

In the invention, the rod-shaped liquid crystal compound molecules or the disc-shaped compound molecules are fixed aligned in the optically anisotropic layer. The average alignment direction of molecular symmetric axes of the liquid crystal compound on the interface on the optical film side crosses the in-plane slow axis of the optical film at an angle of approximately 45 degrees. The term "approximately 45 degrees" as used herein is meant to indicate an angle of 45°±5°, preferably from 42° to 48°, more preferably from 43° to 47°.

The average alignment direction of molecular symmetric axes of the liquid crystal compound can be normally adjusted by selecting the material of the liquid crystal compound or alignment film or by selecting the rubbing method.

In the invention, in the case where an optically compensatory film for OCB mode is prepared for example, an optically anisotropic layer the average alignment direction of molecular symmetric axes of liquid crystal compound of which at least oil the cellulose acylate film interface is 45° with respect to the slow axis of the cellulose acylate film can be formed by preparing an optically anisotropic layer-forming alignment film by rubbing, and then rubbing the alignment film in the direction of 45° with respect to the slow axis of the optical film.

For example, the optically compensatory film of the invention can be continuously prepared from the optical film of the invention the slow axis of which crosses the longitudinal direction at right angle. In some detail, an optically compensatory film of continuous length can be continuously prepared by continuously spreading an alignment film-forming coating solution over the surface of the optical film of continuous length to prepare a film, continuously rubbing the surface of the film in the direction of 45° with respect to the longitudinal direction to prepare an alignment film, continuously spreading an optically anisotropic layer-forming coating solution containing a liquid crystal compound over the alignment film thus prepared, aligning the liquid crystal compound molecules, and then fixing the liquid crystal compound molecules thus aligned to prepare an optically anisotropic layer. The optically compensatory film thus prepared in a continuous length is cut into a desired shape before being incorporated in the liquid crystal display.

Referring to the average alignment direction of molecular symmetric axes of the liquid crystal compound on the surface side thereof (air side), the average alignment direction of molecular symmetric axes of the liquid crystal compound on the air interface side thereof is preferably approximately 45°, more preferably from 42° to 48°, even more preferably from 43° to 47° with respect to the slow axis of the optical film. The average alignment direction of molecular symmetric axes of the liquid crystal compound on the air interface side thereof can be normally adjusted by selecting the kind of the liquid crystal compound used or the additives to be used therewith. Examples of the additives to be used with the liquid crystal compound include plasticizers, surface active agents, polymerizable monomers, and polymers. The degree of change of alignment direction of molecular symmetric axes, too, can be adjusted by selecting the kind of the liquid crystal compound and additives used. In particular, the selection of the surface active agent is preferably compatible with the control of surface tension of the aforementioned coating solution.

The plasticizer, surface active agent and polymerizable monomer to be used with the liquid crystal compound preferably are compatible with the discotic liquid crystal compound and can provide the liquid crystal compound with a change of tilt angle or does not impair the alignment of the liquid crystal compound. Polymerizable monomers (e.g., compound having vinyl group, vinyloxy group, acryloyl group or methacryloyl group) are preferably used. The added amount of the aforementioned compound is normally from 1 to 50% by weight, preferably from 5 to 30% by weight based oil the weight of the liquid crystal compound. The mixing of a monomer having four or more polymerizable reactive functional groups makes it possible to enhance the adhesion between the alignment film and the optically anisotropic layer.

As the discotic liquid crystal compound to be used as a liquid crystal compound there is preferably used a polymer having some compatibility with the discotic liquid crystal compound capable of providing the discotic liquid crystal compound with a change of tilt angle.

Examples of the polymer include cellulose esters. Preferred examples of the cellulose esters employable herein include cellulose acetate, cellulose acetate propionate, hydroxypropyl cellulose and cellulose acetate butyrate. The added amount of the polymer is preferably from 0.1 to 10% by weight, more preferably from 0.1 to 8% by weight, even more preferably from 0.1 to 5% by weight based on the weight of the discotic liquid crystal compound so that the alignment of the discotic liquid crystal compound cannot be impaired.

The discotic nematic liquid crystal phase-solid phase transition temperature of the discotic liquid crystal compound is preferably from 70° C. to 300° C., more preferably from 70° C. to 170° C.

In the invention, the aforementioned "another" optically anisotropic layer has at least in-plane optical anisotropy. The in-plane retardation Re of the aforementioned optically anisotropic layer is preferably from 3 nm to 300 nm, more preferably from 5 nm to 200 nm, even more preferably from 10 nm to 100 nm. The thickness-direction retardation Rth of the aforementioned optically anisotropic layer is preferably from 20 nm to 400 nm, more preferably from 50 nm to 200 nm. The thickness of the aforementioned optically anisotropic layer is preferably from 0.1 µm to 20 µm, more preferably from 0.5 µm to 15 µm, most preferably from 1 µm to 10 µm.

[Alignment Film]

The optically compensatory film of the invention may have an alignment film provided interposed between the optical film of the invention and the optically anisotropic layer. Alternatively, an alignment film may be used only during the preparation of the optically anisotropic layer to form on the alignment film an optically anisotropic layer which is then transferred onto the optical film of the invention.

In the invention, the aforementioned alignment film is preferably a layer made of a crosslinked polymer. As the polymer to be used in the alignment film there may be used a polymer which can be crosslinked itself or a polymer which can be crosslinked with a crosslinking agent. The aforementioned alignment film can be formed by allowing a polymer having a functional group or a polymer having a functional group incorporated therein to react with each other upon the action of light or heat or the change of pH or by introducing a crosslinking agent which is a compound having a high reaction activity into polymer molecules so that the polymer molecules are crosslinked.

The alignment film made of a crosslinked polymer can be normally formed by spreading a coating solution containing the aforementioned polymer optionally in admixture with a crosslinking agent over a support, and then subjecting the coated support to heating or the like.

In order to suppress the generation of dust from the alignment film at the rubbing step described later, it is preferred that the degree of crosslinking of the alignment film be raised. The degree of crosslinking defined by (1−(Ma/Mb)) supposing that Mb is the amount of the crosslinking agent to be incorporated in the coating solution and Ma is the amount of the crosslinking agent left after crosslinking is preferably from 50% to 100%, more preferably from 65% to 100%, most preferably from 75% to 100%.

As the polymer to be used in the alignment film of the invention there may be used either a polymer which can be crosslinked itself or a polymer which can be crosslinked with a crosslinking agent. It goes without saying that a polymer having both the functions can be used. Examples of the aforementioned polymer include polymers such as polymethyl methacrylate, acrylic acid/methacrylic acid copolymer, styrene/maleinimide copolymer, polyvinyl alcohol, modified polyvinyl alcohol, poly(N-methylol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene and polycarbonate, and compounds such as silane coupling agent. Preferred examples of the polymer include water-soluble polymers such as poly(N-methylolacrylamide), carboxymethyl cellulose, gelatin, polyvinyl alcohol and modified polyvinyl alcohol. More desirable among these polymers are gelatin, polyvinyl alcohol and modified polyvinyl alcohol. Particularly preferred among these polymers are polyvinyl alcohol and modified polyvinyl alcohol.

In the case where a polyvinyl alcohol or modified polyvinyl alcohol is directly spread over the optical film (particularly cellulose acylate film) of the invention, a method involving the provision of a hydrophilic undercoating layer or saponification is preferably employed.

Preferred among the aforementioned polymers is polyvinyl alcohol or modified polyvinyl alcohol.

As the polyvinyl alcohol to be used herein there is used one having a percent saponification of from 70% to 100%, preferably from 80% to 100%, more preferably from 82% to 98%. The polymerization degree of the polyvinyl alcohol is preferably from 100 to 3,000.

Examples of the modified polyvinyl alcohol employable herein include modification products of polyvinyl alcohol such as copolymerization products of polyvinyl alcohol (Examples of the modifying group to be incorporated in the polyvinyl alcohol include COONa, Si(OX)$_3$, N(CH$_3$)$_3$.Cl, C$_9$H$_{19}$COO, SO$_3$Na, and C$_{12}$H$_{25}$), chain transfer modification products of polyvinyl alcohol (Examples of the modifying group to be incorporated in the polyvinyl alcohol include COONa, SH, and SC$_{12}$H$_{25}$) and block polymerization modification products of polyvinyl alcohol (Examples of the modifying group to be incorporated in the polyvinyl alcohol include COOH, CONH$_2$, COOR, and C$_6$H$_5$). The polymerization degree of the modified polyvinyl alcohol is preferably from 100 to 3,000. Preferred among these polyvinyl alcohols are unmodified or modified polyvinyl alcohols having a percent saponification of from 80% to 100%. More desirable among these polyvinyl alcohols are unmodified or alkylthio-modified polyvinyl alcohols having a percent saponification of from 85% to 95%.

The polyvinyl alcohol preferably has a crosslinking/polymerization activating group incorporated therein to render itself adhesive to the optically anisotropic layer including optical film ad liquid crystal. For the details of preferred examples of crosslinking/polymerization activating group, reference can be made to JP-A-8-338913.

In order to use a hydrophilic polymer such as polyvinyl alcohol in the alignment film, the water content of the hydrophilic polymer is preferably controlled to a range of from 0.4% to 2.5%, more preferably from 0.6% to 1.6% from the standpoint of film hardness. For the measurement of water content, a commercially available Karl Fischer water content meter may be used.

The alignment film preferably has a thickness of 10 µm or less.

[Polarizing Plate]

In the invention, a polarizing plate made of a polarizing plate and a pair of protective films for interposing the polarizing plate therebetween may be used. For example, a polarizing plate obtained by dyeing a polarizer made of a polyvinyl alcohol film or the like with iodine, stretching the polarizer, and then laminating a protective film on the both sides thereof can be used. The polarizing plate is disposed outside the liquid crystal cell. A pair of polarizing plates comprising a polarizer and a pair of protective films for interposing the polarizing plate therebetween may be disposed with a liquid crystal cell interposed therebetween. As mentioned above, the protective film to be disposed on the liquid crystal cell side may be an optically compensatory film (cellulose acylate film) of the invention.

<<Adhesive>>

The adhesive with which the polarizer and the protective film are bonded to each other is not specifically limited but may be a PVA-based resin (e.g., modified PVA such as acetoacetyl group, sulfonic acid group, carboxyl group and oxyalkylene group), an aqueous solution of boron compound or the like. Preferred among these adhesives is PVA-based resin. The dried thickness of the adhesive layer is preferably from 0.01 µm to 10 µm, particularly preferably from 0.05 µm to 5 µm.

<<Continuous Process for Production of Polarizer and Transparent Protective Film>>

The process for the production of the polarizing plate which can be used in the invention involves a drying step of shrinking the stretched film for polarizer to reduce the evaporation fraction thereof. The lamination of a transparent protective film on at least one side of the film after or during drying may be followed by a post-heating step. In an embodiment where the transparent protective film acts also as a support for the optically anisotropic layer which acts as a transparent film, the lamination of a transparent protective film on one side of the film and a transparent support having an optically anisotropic layer on the other side of the film may be followed by a post-heating step. Referring further to laminating method, the transparent protective film may be stuck to the polarizer with an adhesive while being kept retained at the both edges thereof during the drying step. Thereafter, the film is trimmed at the both ends thereof. Alternatively, there may be employed a method which comprises releasing the film for polarizer from the both end retaining portion after drying, trimming the film at the both ends thereof, and then laminating a transparent protective film to the film. As the trimming method there may be used any ordinary technique such as cutting with a cutter such as blade and cutting by laser beam. In order to drying the adhesive and improve the polarization properties of the laminate, the laminate is preferably heated. The heating conditions depend on the adhesive used. However, in the case where an aqueous adhesive is used, heating is preferably effected at 30° C. or more, more preferably from 40° C. to 100° C., even more preferably from 50° C. to 90° C. These steps are effected in a continuous line to advantage from the standpoint of properties and production efficiency.

<<Properties of Polarizing Plate>>

The optical properties and durability (short-term and long-term storage properties) of the polarizing plate comprising a transparent protective film, a polarizer and a transparent support related to the invention are preferably equal to or higher than that of commercially available super high contrast products (e.g., HLC2-5618, produced by SANRITZ CORPORATION). In some detail, the polarizing plate of the invention exhibits a visible light transmission of 42.5% or more, a polarization degree $\{(Tp-Tc)/(Tp+Tc)\}^{1/2}$ of 0.9995 or more (in which Tp represents parallel transmission and Tc represents crossed transmission) and a transmission change of 3% or less, preferably 1% or less and a polarization degree change of 1% or less, preferably 0.1% or less based on absolute value after allowed to stand at 60° C. and 90% RH for 500 hours and in a dry atmosphere at 80° C. for 500 hours.

[Liquid Crystal Display]

The polarizing plate having the aforementioned retarder plate and optionally the polarizer laminated thereon is used in a liquid crystal display, particularly transmission type liquid crystal display to advantage.

The transmission type liquid crystal display comprises a liquid crystal cell and two sheets of polarizing plates disposed on the respective side thereof. The polarizing plate comprises a polarizer and two sheets of transparent protective films disposed on the respective side thereof. The liquid crystal cell has a liquid crystal supported interposed between two sheets of electrode substrates.

A sheet of the retarder plate of the invention is disposed interposed between the liquid crystal cell and one of the polarizing plates. Alternatively, two sheets of the retarder plate are respectively disposed interposed between the liquid crystal cell and both the polarizing plates.

The polarizing plate of the invention may be used as at least one of the two sheets of the polarizing plate to be disposed on the respective side of the liquid crystal cell. In this arrangement, the polarizing plate of the invention is disposed such that the retarder plate is disposed on the liquid crystal cell side.

The liquid crystal cell is preferably of VA, OCB, IPS or TN mode.

In a VA mode liquid crystal cell, rod-shaped liquid crystal molecules are substantially vertically aligned when no voltage is applied, VA mode liquid crystal cells include (1) liquid crystal cell in VA mode in a narrow sense in which rod-shaped liquid crystal molecules are aligned substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multidomained to expand the viewing angle (MVA mode) (as disclosed in SID97, Digest of Tech. Papers (preprint) 28 (1997), 845), (3) liquid crystal cell of mode in which rod-shaped molecules are aligned substantially vertically when no voltage is applied but aligned in twisted multidomained mode when a voltage is applied (n-ASM mode) (as disclosed in Preprints of Symposium on Japanese Liquid Crystal Society Nos. 58 to 59, 1998 and (4) liquid crystal cell of SUR-VALVAL mode (as reported in LCD International 98).

An OCB mode liquid crystal cell is a liquid crystal cell of bend alignment mode wherein rod-shaped liquid crystal molecules are aligned in substantially opposing directions (symmetrically) from the upper part to the lower part of the liquid crystal cell as disclosed in U.S. Pat. Nos. 4,583,825 and 5,410,422. In the OCB mode liquid crystal cell, rod-shaped liquid crystal molecules are aligned symmetrically with each other from the upper part to the lower part of the liquid crystal cell. Therefore, the bend alignment mode liquid crystal cell has a self optical compensation capacity.

Accordingly, this liquid crystal mode is also called OCB (optically compensated bend) liquid crystal mode. The bend alignment mode liquid crystal display is advantageous in that it has a high response.

An IPS mode liquid crystal cell has rod-shaped liquid crystal molecules aligned substantially parallel to the substrate. The liquid crystal molecules respond planarly when an electric field is applied in parallel to the surface of the substrate. An IPS mode liquid crystal cell displays black when no electric field is applied thereto. In this state, the transmission axis of a pair of upper and lower polarizing plates are disposed perpendicular to each other. Methods for eliminating light leakage in oblique direction during black display using an optically compensatory sheet to enhance viewing angle are disclosed in JP-A-10-54982, JP-A-11-202323, JP-A-9-292522, JP-A-11-133408, JP-A-11-305217, JP-A-10-307291, etc.

In a TN mode liquid crystal cell, rod-shaped liquid crystal molecules are aligned substantially horizontally and twist-aligned at an angle of from 60° to 120° when no voltage is applied thereto. TN mode liquid crystal cells are most popular as color TFT liquid crystal display and referred to in many literatures.

EXAMPLE 1

Preparation of Cellulose Acylate Film (PK-1)

The following components were charged in a mixing tank where the) were then heated with stirring to cause the dissolution thereof. Thus, a cellulose triacetate (triacetyl cellulose: TAC) solution was prepared.

hours was measured for retardation value (Re) at a wavelength of 550 nm. The result was 45.0 nm. The test specimen was also measured for retardation value (Rth) at a wavelength of 550 nm. The result was 41.0 nm.

The test specimen was similarly measured for retardation value (Re) at a wavelength of 450 nm and 650 nm. The results were 31 nm and 59 nm, respectively. The test specimen was then similarly measured for retardation value (Rth) at a wavelength of 450 nm and 650 nm. The results were 29 nm and 48 nm, respectively.

In other words, A1 value and A2 value were 0.69 and 1.31, respectively. Further, B1 value and B2 value were 0.97 and 1.12, respectively.

The degree of alignment P calculated from X-ray diffractometry was 0.13.

For X-ray diffractometry, RINT RAPID (produced by Rigaku Corporation) was used with a Cu tube as a light source. X rays were generated at 40 kV-36 mA. The collimator had an aperture having a diameter of 0.8 mm$\phi$. The film sample was fixed to a transmission sample holder. The exposure time was 600 seconds.

A 1.0 N solution of potassium hydroxide (solvent: 69.2 parts by weight/15 parts by weight/15.8 parts by weight of water, isopropyl alcohol and propylene glycol) was spread over the both sides of the cellulose acylate film (PK-1) thus prepared at a rate of 10 cc/m$^2$, and then kept at about 40° C. for 30 seconds. The alkaline solution was then scraped off the film. The film was then washed with purified water. The water droplets were then removed with air knife. Thereafter, the

| Material/solvent formulation | |
|---|---|
| Cellulose acetate (percent substitution: 2.81: percent acetylation: 60.2%) | 100 parts by weight |
| Triphenyl phosphate (plasticizer) | 6.5 parts by weight |
| Biphenyl diphenyl phosphate (plasticizer) | 5.2 parts by weight |
| Methylene chloride (first solvent) | 500 parts by weight |
| Methanol (second solvent) | 80 parts by weight |
| Retardation raising agent ($\lambda$max = 230 nm) | 1.0 parts by weight |
| Retardation raising agent | |

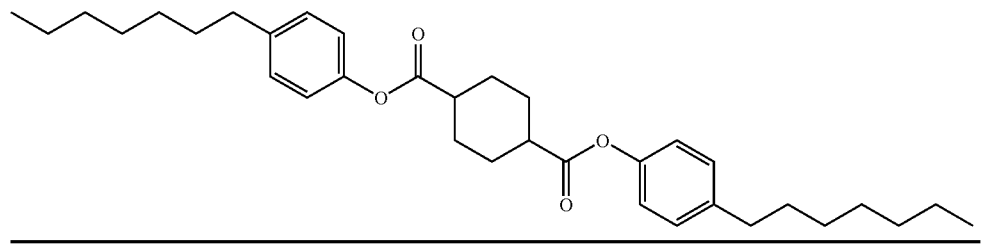

The dope thus obtained was then casted using a casting machine comprising a band having a width of 2 m and a length of 65 m. When the temperature of the surface of the film on the band reached 40° C., the film was then dried for 1 minute. The film was peeled off the band, and then dried with 135° C. drying air for 20 minutes. Thereafter, the film was monoaxially stretched by a factor of 120% at a temperature of 185° C. The cellulose acylate used had Tg of 140° C.

The cellulose acylate film (PK-1) thus prepared had a thickness of 88 μm. Using a Type M-150 ellipsometer (produced by JASCO Co., Ltd.), the cellulose acylate film which had been moisture-conditioned at 25° C. and 55% RH for 2 film was dried at 100° C. for 15 seconds. The film (PK-1) was then measured for contact angle with respect to purified water. The result was 42°.

(Preparation of Alignment Film)

Au alignment film coating solution having the following formulation was spread over the cellulose acylate film (PK-1) at a rate of 28 ml/m$^2$ using a #16 wire bar coater. The film was dried with 60° C. hot air for 60 seconds and then with 90° C. hot air for 150 seconds to prepare an alignment film

| Formulation of alignment film coating solution | |
|---|---|
| Modified polyvinyl alcohol shown below | 10 parts by weight |
| Water | 371 parts by weight |
| Methanol | 119 parts by weight |
| Glutaraldehyde (crosslinking agent) | 0.5 parts by weight |
| Ester citrate (AS3, produced by Sankyo Chemical Industries, Ltd.) | 0.35 parts by weight |
| Modified polyvinyl alcohol | |

—(CH$_2$—CH)$_{87.8}$— —(CH$_2$—CH)$_{0.2}$— —(CH$_2$—CH)$_{12.0}$—
  |                              |                              |
  OH                             O                              O
                                 |                              |
                                 C=O                            C=O
                                 |                              |
                                                                CH$_3$

O(CH$_2$)$_4$OCOCH=CH$_2$

The alignment film was dried at 25° C. for 60 seconds, 60° C. hot air for 60 seconds and then with 90° C. hot air for 150 seconds. The alignment film thus dried had a thickness of 1.1 μm. The alignment film was then measured for surface roughness using a Type SPI3800 N atomic force microscope (produced by Seiko Instruments Co., Ltd.). The result was 1.147 nm.

(Formation of Optically Anisotropic Layer)

A coating solution containing a discotic liquid crystal having the following formulation was continuously spread over the alignment film on the film PK-1 which was being conveyed at a rate of 20 m/min using a #2.8 wire bar which was being rotated at 391 rpm in the same direction as the conversing direction of the film.

| Formulation of discotic liquid crystal coating solution | |
|---|---|
| Discotic liquid crystal compound shown below | 32.6% by weight |
| Compound shown below (additive for aligning the disc surface at 5 degrees or less) | 0.1% by weight |
| Ethylene oxide-modified trimethylol propane triacrylate (V#360, produced by OSAKA ORGANIC CHEMICAL INDUSTRY LTD.) | 3.2% by weight |
| Sensitizer (Kayacure DETC, produced by Nippon Kayaku Corporation) | 0.4% by weight |
| Photopolymerization initiator (Irgacure 907, produced by Ciba Geigy Inc.) | 1.1% by weight |
| Methyl ethyl ketone | 62.0% by weight |
| Discotic liquid crystal compound | |

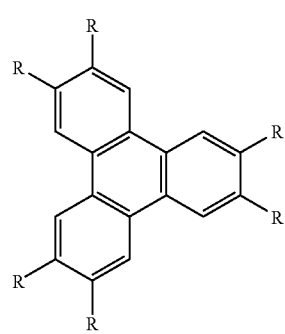

-continued

Formulation of discotic liquid crystal coating solution

R; —O—CO—C$_6$H$_4$—O—(CH$_2$)$_4$—O—CO—CH=CH$_2$

Additive for aligning the disc surface (triazine structure with three HN-aryl-R substituents)

R: —CH$_2$—(CF$_2$)$_8$—H

At a step of continuously heating the film at a temperature of from room temperature to 100° C., the solvent was dried up. Thereafter, the film was dried in a 130° C. drying zone for about 90 seconds such that the wind velocity on the surface of the discotic liquid crystal compound reached 2.5 m/sec to align the discotic liquid crystal compound. Subsequently, the film was irradiated with ultraviolet rays from an ultraviolet radiator (ultraviolet lamp: output of 120 W/cm) for 4 seconds with the surface temperature of the film kept at about 130° C. so that the crosslinking reaction was allowed to proceed to fix the discotic liquid crystal compound thus aligned. Thereafter, the film was allowed to cool to room temperature where it was cylindrically wound up to form a roll. Thus, a rolled optically compensatory film (KH-1) was prepared.

The angle of the disc surface of the discotic liquid crystal compound with respect to the surface of the transparent polymer film was 0 degree.

The optical compensatory film (KH-1) thus prepared was then measured for optical properties. The optical compensatory film (KH-1) which had been moisture-conditioned at 25° C. and 55% RH for 2 hours was then measured for retardation value (Re) at a wavelength of 550 nm. The result was 45.0 nm. The test specimen was also measured for retardation value (Rth) at a wavelength of 550 nm. The result was 160.0 nm.

The test specimen was similarly measured for retardation value (Re) at a wavelength of 450 nm and 650 nm. The results were 31 nm and 59 nm, respectively. The test specimen was then similarly measured for retardation value (Rth) at a wavelength of 450 nm and 650 nm. The results were 171 nm and 155 nm, respectively.

In other words, A1 value and A2 value were 0.69 and 131, respectively. Further, B1 value and B2 value were 0.64 and 1.35, respectively.

With a polarizing plate disposed in crossed Nicols, the optically compensatory film (KH-1) was then measured for unevenness. As a result, the optically compensatory film (KH-1) had no unevenness detected even when viewed front ways and at an angle of from 0° to 60° from the normal line.

EXAMPLE 2

Preparation of Cellulose Acylate Film (PK-2)

The following components were charged in a mixing tank where they were then heated with stirring to cause the dissolution thereof. Thus, a cellulose triacetate solution was prepared.

| Material/solvent formulation | |
|---|---|
| Cellulose acetate (percent substitution: 2.77: percent acetylation: 59.7%) | 100 parts by weight |
| Triphenyl phosphate (plasticizer) | 6.5 parts by weight |
| Biphenyl diphenyl phosphate (plasticizer) | 5.2 parts by weight |
| Methylene chloride (first solvent) | 500 parts by weight |
| Methanol (second solvent) | 80 parts by weight |
| Retardation raising agent shown above | 2.5 parts by weight |

The dope thus obtained was then casted using a casting machine comprising a bead having a width of 2 m and a length of 65 m. When the temperature of the surface of the film on the band reached 40° C., the film was then dried for 1 minute. The film was peeled off the band, and then dried with 135° C. drying air for 20 minutes. Thereafter, the film was monoaxially stretched at a temperature of 200° C. such that the length reached 130% after stretching. The cellulose acylate used had Tg of 140° C.

The cellulose acylate film (PK-2) thus prepared had a thickness of 88 µm. Using a Type M-150 ellipsometer (produced by JASCO Co., Ltd.), the cellulose acylate film which had been moisture-conditioned at 25° C. and 55% RH for 2 hours was measured for retardation value (Re) at a wavelength of 550 nm. The result was 51.0 nm. The test specimen was also measured for retardation value (Rth) at a wavelength of 550 nm. The result was 37.0 nm.

The test specimen was similarly measured for retardation value (Re) at a wavelength of 450 nm and 650 nm. The results were 33 nm and 70 nm, respectively. The test specimen was then similarly measured for retardation value (Rth) at a wavelength of 450 nm and 650 nm. The results were 24 nm and 43 nm, respectively.

In other words, A1 value and A2 value were 0.65 and 1.37, respectively. Further, B1 value and B2 value were 1.00 and 1.18, respectively.

The degree of alignment P was 0.15.

A 1.0 N solution of potassium hydroxide (solvent: 69.2 parts by weight/15 parts by weight/15.8 parts by weight of water, isopropyl alcohol and propylene glycol) was spread over the both sides of the cellulose acylate film (PK-2) thus prepared at a rate of 10 cc/m$^2$, and then kept at about 40° C. for 30 seconds. The alkaline solution was then scraped off the film. The film was then washed with purified water. The water droplets were then removed with air knife. Thereafter, the film was dried at 100° C. for 15 seconds. The film (PK-2) was then measured for contact angle with respect to purified water. The result was 42°.

(Preparation of Alignment Film)

An alignment film was then formed on the cellulose acylate film (PK-2) in the same manner as in Example 1.

(Formation of Optically Anisotropic Layer)

A coating solution containing the same discotic liquid crystal as used in Example 1 was continuously spread over the alignment film on the film PK-2 which was being conveyed at a rate of 20 m/min using a #2.0 wire bar which was being rotated at 391 rpm in the same direction as the conveying direction of the film.

At a step of continuously heating the film at a temperature of from room temperature to 100° C., the solvent was dried up. Thereafter, the film was dried in a 130° C. drying zone for about 90 seconds such that the wind velocity on the surface of the discotic liquid crystal compound reached 2.5 m/sec to align the discotic liquid crystal compound. Subsequently, the film was irradiated with ultraviolet rays from an ultraviolet radiator (ultraviolet lamp: output of 120 W/cm) for 4 seconds with the surface temperature of the film kept at about 130° C. so that the crosslinking reaction was allowed to proceed to fix the discotic liquid crystal compound thus aligned. Thereafter, the film was allowed to cool to room temperature where it was cylindrically wound up to form a roll. Thus, a rolled optically compensatory film (KH-2) was prepared.

The optical compensatory film (KH-2) thus prepared was then measured for optical properties. The optical compensatory film (KH-1) which had been moisture-conditioned at 25° C. and 55% RH for 2 hours was then measured for retardation value (Re) at a wavelength of 550 nm. The result was 51.0 nm. The test specimen was also measured for retardation value (Rth) at a wavelength of 550 nm. The result was 125.0 nm.

The test specimen was similarly measured for retardation value (Re) at a wavelength of 450 nm and 650 nm. The results were 33 nm and 70 nm, respectively. The test specimen was then similarly measured for retardation value (Rth) at a wavelength of 450 nm and 650 nm. The results were 140 nm and 115 nm, respectively.

In other words, A1 value and A2 value were 0.65 and 1.37, respectively. Further, B1 value and B2 value were 0.58 and 1.49, respectively.

With a polarizing plate disposed in crossed Nicols, the optically compensatory film (KH-2) was then measured for unevenness. As a result, the optically compensatory film (KH-2) had no unevenness detected even when viewed front ways and at an angle of from 0° to 60° from the normal line.

EXAMPLE 3

Preparation of Cellulose Acylate Film (PK-3)

The following components were charged in a mixing tank where they were then heated with stirring to cause the dissolution thereof. Thus, a cellulose triacetate solution was prepared.

| Material/solvent formulation | |
|---|---|
| Cellulose acetate (percent substitution: 2.77: percent acetylation: 59.7%) | 100 parts by weight |
| Triphenyl phosphate (plasticizer) | 6.5 parts by weight |
| Biphenyl diphenyl phosphate (plasticizer) | 5.2 parts by weight |
| Methylene chloride (first solvent) | 500 parts by weight |
| Methanol (second solvent) | 80 parts by weight |
| Retardation raising agent shown above | 3.5 parts by weight |

The dope thus obtained was then casted using a casting machine comprising a band having a width of 2 m and a length of 65 m. When the temperature of the surface of the film on the band reached 40° C., the film was then dried for 1 minute. The film was peeled off the band, and then dried with 135° C. drying air for 20 minutes. Thereafter, the film was monoaxially stretched at a temperature of 185° C. such that the length reached 135% after stretching. The cellulose acylate used had Tg of 140° C.

The cellulose acylate film (PK-3) thus prepared had a thickness of 88 μm. Using a Type M-150 ellipsometer (produced by JASCO Co., Ltd.), the cellulose acylate film which had been moisture-conditioned at 25° C. and 55% RH for 2 hours was measured for retardation value (Re) at a wavelength of 550 nm. The result was 70 nm. The test specimen was also measured for retardation value (Rth) at a wavelength of 550 nm. The result was 64 nm.

The test specimen was similarly measured for retardation value (Re) at a wavelength of 450 nm and 650 nm. The results were 49 nm and 92 nm, respectively. The test specimen was then similarly measured for retardation value (Rth) at a wavelength of 450 nm and 650 nm. The results were 45 nm and 75 nm, respectively.

In other words, A1 value and A2 value were 0.70 and 1.31, respectively. Further, B1 value and B2 value were 1.00 and 1.12, respectively.

The degree of alignment P was 0.15.

A 1.0 N solution of potassium hydroxide (solvent: 69.2 parts by weight/15 parts by weight/15.8 parts by weight of water, isopropyl alcohol and propylene glycol) was spread over the both sides of the cellulose acylate film (PK-3) thus prepared at a rate of 10 cc/m$^2$, and then kept at about 40° C. for 30 seconds. The alkaline solution was then scraped off the film. The film was then washed with purified water. The water droplets were then removed with air knife. Thereafter, the film was dried at 100° C. for 15 seconds. The film (PK-3) was then measured for contact angle with respect to purified water. The result was 42°.

(Preparation of Alignment Film)

An alignment film was then formed on the cellulose acylate film (PK-3) in the same manner as in Example 1.

(Formation of Optically Anisotropic Layer)

A coating solution containing the same discotic liquid crystal as used in Example 1 was continuously spread over the alignment film on the film PK-3 which was being conveyed at a rate of 20 m/min using a #3.4 wire bar which was being rotated at 391 rpm in the same direction as the conveying direction of the film.

At a step of continuously heating the film at a temperature of from room temperature to 100° C., the solvent was dried up. Thereafter, the film was dried in a 130° C. drying zone for about 90 seconds such that the wind velocity on the surface of the discotic liquid crystal compound reached 2.5 in/sec to align the discotic liquid crystal compound. Subsequently, the film was irradiated with ultraviolet rays from an ultraviolet radiator (ultraviolet lamp: output of 120 W/cm) for 4 seconds with the surface temperature of the film kept at about 130° C. so that the crosslinking reaction was allowed to proceed to fix the discotic liquid crystal compound thus aligned. Thereafter, the film was allowed to cool to room temperature where it was cylindrically wound up to form a roll. Thus, a rolled optically compensatory film (KH-3) was prepared.

The optical compensatory film (KH-3) thus prepared was then measured for optical properties. The optical compensatory film (KH-3) which had been moisture-conditioned at 25° C. and 55% RH for 2 hours was then measured for retardation value (Re) at a wavelength of 550 nm. The result was 70 nm. The test specimen was also measured for retardation value (Rth) at a wavelength of 550 nm. The result was 210 nm.

The test specimen was similarly measured for retardation value (Re) at a wavelength of 450 nm and 650 nm. The results were 49 nm and 92 nm, respectively. The test specimen was then similarly measured for retardation value (Rth) at a wavelength of 450 nm and 650 nm. The results were 224 nm and 203 nm, respectively.

In other words, A1 value and A2 value were 0.70 and 1.31, respectively. Further, B1 value and B2 value were 0.66 and 1.36, respectively.

With a polarizing plate disposed in crossed Nicols, the optically compensatory film (KH-3) was then measured for unevenness. As a result, the optically compensatory film (KH-3) had no unevenness detected even when viewed front ways and at an angle of from 0° to 60° from the normal line.

EXAMPLE 4

A 1.0 N solution of potassium hydroxide (solvent: 69.2 parts by weight/15 parts by weight/15.8 parts by weight of water, isopropyl alcohol and propylene glycol) was spread over the cellulose acylate film side of the rolled optically compensatory film (KH-1) prepared in Example 1 at a rate of 10 cc/m$^2$, and then kept at about 40° C. for 30 seconds. The alkaline solution was then scraped off the film. The film was then washed with purified water. The water droplets were then removed with air knife. Thereafter, the film was dried at 100° C. for 15 seconds.

The film was then measured for contact angle with respect to purified water. The result was 42°.

(Formation of Alignment Film)

An alignment film coating solution having the following formulation was spread over the alkali-treated surface of the film at a rate of 28 ml/m$^2$ using a #16 wire bar coater. The film was dried with 60° C. hot air for 60 seconds and then with 90° C. hot air for 150 seconds to prepare an alignment film.

| Formulation of alignment film coating solution | |
|---|---|
| Modified polyvinyl alcohol shown below | 10 parts by weight |
| Water | 371 parts by weight |
| Methanol | 119 parts by weight |
| Glutaraldehyde (crosslinking agent) | 0.5 parts by weight |
| Ester citrate (AS3, produced by Sankyo Chemical Industries, Ltd.) | 0.35 parts by weight |

-continued

Formulation of alignment film coating solution

Modified polyvinyl alcohol

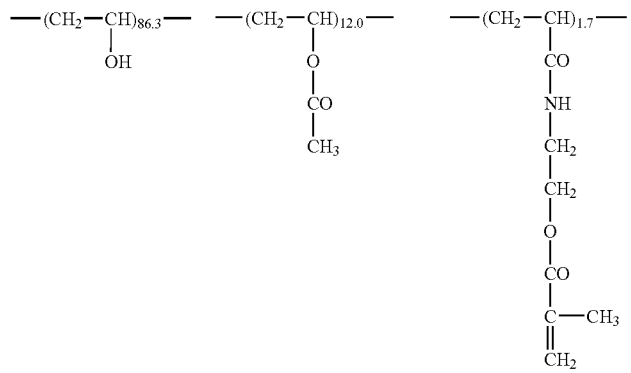

(Rubbing Treatment)

The film (KH-1) having an alignment film formed thereon was subjected to rubbing on the alignment film surface thereof while being conveyed at a rate of 20 m/min over a rubbing roller (diameter: 300 mm) which was being rotated at 650 rpm and arranged such that the rubbing direction was 45° with respect to the longitudinal direction. Arrangement was made such that the length of contact of the rubbing roller with the film was 18 mm.

(Formation of Another Optically Anisotropic Layer)

41.01 kg of the disc-shaped liquid crystal compound as used in Example 1, 4.06 kg of an ethylene oxide-modified trimethylolpropane triacrylate (V#360, produced by OSAKA ORGANIC CHEMICAL INDUSTRY LTD.), 0.35 kg of cellulose acetate butyrate (CAB531-1, produced by Eastman Chemical Co., Ltd.), 1.35 kg of a photopolymerization initiator (Irgacure 907, produced by Nihon Ciba-Geigy K.K.) and 0.45 kg of a sensitizer (Kayacure DETX, produced by Nippon Kayaku Corporation) were dissolved in 102 kg of methyl ethyl ketone. To the solution thus prepared was then added 0.1 kg of a fluoroaliphatic group-containing copolymer (Megafac F780, produced by DAINIPPON INK AND CHEMICALS, INCORPORATED) to prepare a coating solution. The coating solution thus prepared was then continuously spread over the alignment film surface of the film which was being conveyed at a rate of 20 m/min using a #3.2 wire bar which was being rotated at 391 rpm in the same direction as the conveying direction of the film.

The film was continuously heated from room temperature to 100° C. so that the solvent was dried up. Thereafter, the film was dried in a 130° C. drying zone for about 90 seconds such that the wind velocity on the surface of the discotic liquid crystal compound reached 2.5 m/sec to align the discotic liquid crystal compound. Subsequently, the film was conveyed to a 80° C. drying zone where it was then irradiated with ultraviolet rays having an illuminance of 600 mW from an ultraviolet radiator (ultraviolet lamp: output of 160 W/cm; emission wavelength: 1.6 m) for 4 seconds with the surface temperature of the film kept at about 100° C. so that the crosslinking reaction was allowed to proceed to fix the discotic liquid crystal compound thus aligned. Thereafter, the film was allowed to cool to room temperature where it was cylindrically wound up to form a roll. Thus, a rolled optically compensatory film (KH-4) was prepared.

The optically anisotropic layer was then measured for viscosity at a film surface temperature of 127° C. The result was 695 cp. For the measurement of viscosity of optically anisotropic layer, a liquid crystal layer having the same formulation as that of the optically anisotropic layer (excluding solvent) was measured by a heated E type viscometer.

The rolled optically compensatory film (KH-4) thus prepared was partly cut out to prepare a sample which was then measured for optical properties. Re retardation value of the optically compensatory film measured at a wavelength of 550 nm was 38 nm. The angle (angle of inclination) of the disc surface of the disc-shaped liquid crystal compound with respect to the surface of the support in the optically anisotropic layer showed a continuous change in the layer depth direction and was 28° on the average. Further, only the optically anisotropic layer was peeled off the sample. The optically anisotropic layer thus peeled was then measured for average direction of molecular symmetric axes. As a result, the average direction of molecular symmetric axes was 45° with respect to the longitudinal direction of the optically compensatory film.

COMPARATIVE EXAMPLE 1

Preparation of Cellulose Acylate Film (PK-H1)

The following components were charged in a mixing tank where they were then heated with stirring to cause the dissolution thereof. Thus, a cellulose triacetate solution was prepared.

| Material/solvent formulation | |
|---|---|
| Cellulose acetate (percent acetylation: 60.9%) | 100 parts by weight |
| Triphenyl phosphate (plasticizer) | 7.8 parts by weight |
| Biphenyl diphenyl phosphate (plasticizer) | 3.9 parts by weight |
| Methylene chloride (first solvent) | 300 parts by weight |

| Material/solvent formulation | |
|---|---|
| Methanol (second solvent) | 45 parts by weight |
| Dye (360FP, produced by Sumika Finechem Co., Ltd.) | 0.0009 parts by weight |

In a separate mixing tank were charged 16 parts by weight of the following retardation raising agent (UV526: λmax=328 nm), 80 parts by weight of methylene chloride and 20 parts by weight of methanol which were then heated with stirring to prepare a retardation raising agent solution.

To 464 parts by weight of the cellulose acetate solution having the aforementioned formulation were then added 36 parts by weight of the following retardation raising agent solution and 1.1 parts by weight of a particulate silica (R972, produced by Aerosil Co., Ltd.). The mixture was then thoroughly stirred to prepare a dope. The added amount of the retardation raising agent was 5.0 parts by weight based on 100 parts by weight of the cellulose acetate. The added amount of the particulate silica was 0.15 parts by weight based on 100 parts by weight of the cellulose acetate.

UV526

| Composition ratio | Compound |
|---|---|
| 2 | HO-C6H3(C(=O)C6H5)-O-CH2-C6H5 |
| 1 | C6H5-CH2-O-C6H3(C(=O)C6H5)-O-CH2-C6H5 |

The dope thus obtained was then casted using a casting machine comprising a band having a width of 2 m and a length of 65 m. When the temperature of the surface of the film on the band reached 40° C., the film was then dried for 1 minute. The film was peeled off the band, and then stretched crosswise by a factor of 28% with 140° C. drying air using a tenter. Thereafter, the film was dried with 135° C. drying air for 20 minutes to prepare a cellulose acylate film (PK-H1) having a residual solvent content of 0.3% by weight. The cellulose acylate used had Tg of 140° C.

The cellulose acylate film (PK-H1) thus prepared had a width of 1,340 mm and a thickness of 92 μm. The cellulose acylate film was then measured for retardation value (Re) at a wavelength of 550 nm. The result was 38 nm. The test specimen was also measured for retardation value (Rth) at a wavelength of 550 nm. The result was 175 nm.

The test specimen was similarly measured for retardation value (Re) at a wavelength of 450 nm and 650 nm. The results were 40 nm and 37 nm, respectively. The test specimen was then similarly measured for retardation value (Rth) at a wavelength of 450 nm and 650 nm. The results were 178 nm and 173 nm, respectively.

In other words, A1 value and A2 value were 1.05 and 0.97, respectively. Further, B1 value and B2 value were 1.03 and 0.98, respectively. P value was 0.04.

A hybrid-aligned discotic liquid crystal layer was disposed on the cellulose acylate film (PK-H1) in the same manner as in Example 4 to prepare an optically compensatory film (KH-H1).

EXAMPLE 5

Preparation of Cellulose Acylate Film (PK-5)

The following components were charged in a mixing tank where they were then heated with stirring to cause the dissolution thereof. Thus, a celluose triacetate (triacetyl cellulose: TAC) solution was prepared.

| Material/solvent formulation | |
|---|---|
| Cellulose acetate (percent substitution: 2.81: percent acetylation: 60.2%) | 100 parts by weight |
| Triphenyl phosphate (plasticizer) | 6.5 parts by weight |
| Biphenyl diphenyl phosphate (plasticizer) | 5.2 parts by weight |
| Methylene chloride (first solvent) | 500 parts by weight |
| Methanol (second solvent) | 80 parts by weight |
| Re retardation raising agent shown below (λmax = 230 nm) | 1.0 parts by weight |
| Rth Retardation raising agent shown below (λmax = 276 nm) | 5.6 parts by weight |

-continued

Material/solvent formulation

Re retardation raising agent

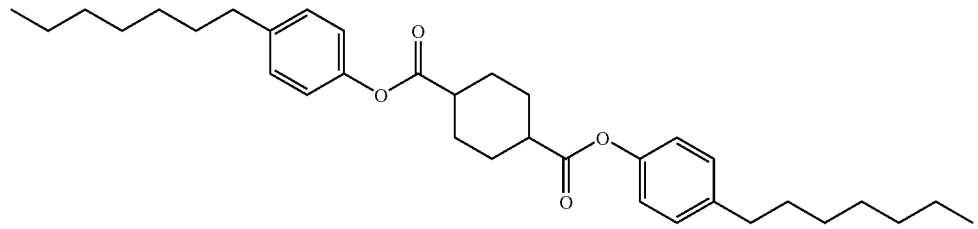

Rth retardation raising agent

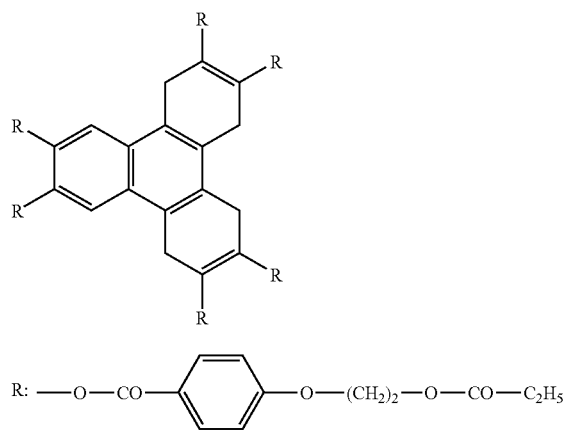

The dope thus obtained was then casted using a casting machine comprising a band having a width of 2 m and a length of 65 m. When the temperature of the surface of the film on the band reached 40° C., the film was then dried for 1 minute. The film was peeled off the band, and then dried with 135° C. drying air for 20 minutes. Thereafter, the film was monoaxially stretched by a factor of 120% at a temperature of 185° C. The celluose acylate used had Tg of 140° C.

The cellulose acylate film (PK-5) thus prepared had a thickness of 88 μm. Using a Type M-150 ellipsometer (produced by JASCO Co., Ltd.), the cellulose acylate film which had been moisture-conditioned at 25° C. and 55% RH for 2 hours was measured for retardation value (Re) at a wavelength of 550 nm. The result was 45.0 nm. The test specimen was also measured for retardation value (Rth) at a wavelength of 550 nm. The result was 165.0 nm.

The test specimen was similarly measured for retardation value (Re) at a wavelength of 450 nm ii and 650 nm. The results were 31 nm and 59 nm, respectively. The test specimen was then similarly measured for retardation value (Rth) at a wavelength of 450 nm and 650 nm. The results were 176 nm and 160 nm, respectively.

In other words, A1 value and A2 value were 0.69 and 1.31, respectively. Further, B1 value and B2 value were 0.64 and 1.35, respectively.

The degree of alignment P calculated from X-ray diffractometry was 0.15.

The same "optically anisotropic layer" as in Example 1 was spread over the cellulose acylate film (PK-5) to prepare an optically compensatory film (KH-5).

The same "another optically anisotropic layer" as in Example 1 was spread on the cellulose acylate film which was then packed in an OCB cell. As a result, properties similar to that of Example 1 were obtained.

EXAMPLE 6

Formation of Alignment Film

The rolled optically compensatory film (KH-3) prepared in Example 3 was subjected to alkaline treatment on the cellulose acylate film side thereof in the same manner as in Example 4 to form an alignment film on the alkali-treated side thereof (Formation of Optically Anisotropic Layer Containing Rod-Shaped Liquid Crystal Compound)

A coating solution containing a rod-shaped liquid crystal compound having the following formulation was prepared. The coating solution thus prepared was continuously spread over the alignment film side of the optically compensatory film (KH-3) which was being conveyed at a rate of 20 m/min using a #5.0 wire bar which was being rotated at 391 rpm in the same direction as the conveying direction of the film.

At a step of continuously heating the film at a temperature of from room temperature to 90° C., the solvent was dried up. Thereafter, the film was dried in a 90° C. drying zone for about 90 seconds such that the wind velocity on the surface of the optically anisotropic layer reached 2.5 m/sec to align the rod-shaped liquid crystal compound. Subsequently, the film was conveyed to a 80° C. drying zone wherein it was then irradiated with ultraviolet rays having an illuminance of 600 mW from an ultraviolet radiator (ultraviolet lamp: output of 160 W/cm; emission wavelength: 1.6 m) for 4 seconds with the surface temperature of the film kept at about 80° C. so that the crosslinking reaction was allowed to proceed to fix the rod-shaped liquid crystal compound thus aligned. Thereafter, the film was allowed to cool to room temperature where it was cylindrically wound up to form a roll. Thus, a rolled optically compensatory film (KH-6) was prepared.

| Formulation of coating solution containing rod-shaped liquid crystal compound | |
|---|---|
| Rod-shaped liquid crystal compound shown below | 100 parts by weight |
| Photopolymerization initiator (Irgacure 907, produced by Ciba Geigy Inc.) | 3 parts by weight |
| Sensitizer (Kayacure DETX, produced by Nippon Kayaku Corporation) | 1 part by weight |
| Fluorine-based polymer | 0.2 parts by weight |
| Pyridinium salt shown below | 2 parts by weight |
| Methyl ethyl ketone | 198 parts by weight |
| Rod-shaped liquid crystal compound | |

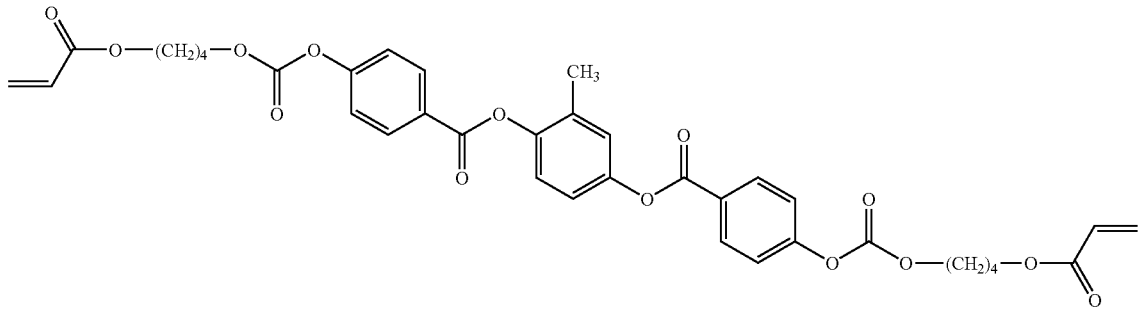

Fluorine-based polymer

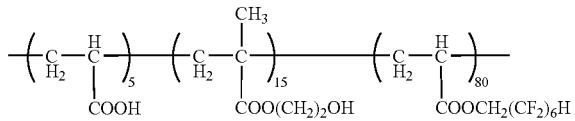

Pyridinium salt

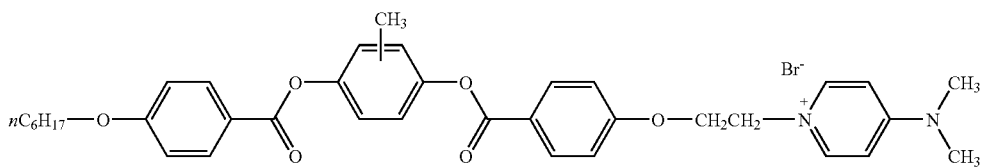

The rolled optically compensatory film (KH-6) thus prepared was partly cut out to prepare a sample. Only the optically anisotropic layer comprising a rod-shaped liquid crystal compound was peeled off the sample. The optically anisotropic layer thus peeled was then measured for optical properties. Re and Rth of the optically anisotropic layer measured at a wavelength of 550 nm were 0 nm and −280 nm, respectively. It was further confirmed that an optically anisotropic layer aligned substantially vertically to the surface of the film had been formed.

COMPARATIVE EXAMPLE 2

Preparation of Cellulose Acylate Film (PK-H2)

The following components were charged in a mixing tank where they were then heated with stirring to cause the dissolution thereof. Thus, a cellulose triacetate solution was prepared.

Formulation of Cellulose Acetate Solution

| | |
|---|---|
| Cellulose acetate (percent acetylation: 60.9%; polymerization degree: 300; Mn/Mw: 1.5) | 100 parts by weight |
| Triphenyl phosphate (plasticizer) | 7.8 parts by weight |
| Biphenyl diphenyl phosphate (plasticizer) | 3.9 parts by weight |
| Methylene chloride (first solvent) | 300 parts by weight |
| Methanol (second solvent) | 54 parts by weight |
| 1-Butanol (third solvent) | 11 parts by weight |

In a separate mixing tank were charged 16 parts by weight of the following retardation raising agent A, 8 parts by weight of the following retardation raising agent B, 0.28 parts by weight of particulate silicon dioxide (average particle diameter: 0.1 μm), 80 parts by weight of methylene chloride and 20 parts by weight of methanol which were then heated with stirring to prepare a retardation raising agent solution (and a particulate material dispersion). To 474 parts by weight of the cellulose acetate solution were then added 45 parts by weight of the retardation raising agent solution. The mixture was then thoroughly stirred to prepare a dope.

Retardation Raising Agent A

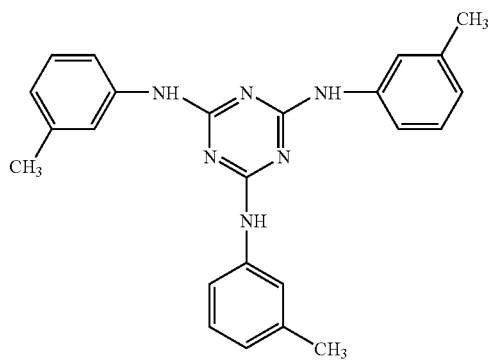

Retardation Raising Agent B

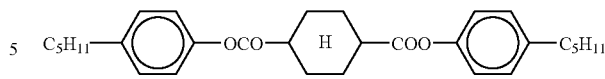

The dope thus obtained was then casted using a casting machine comprising a band having a width of 2 m and a length of 65 m. The film having a residual solvent content of 15% by weight was crosswise stretched by a factor of 20% at 130° C. using a tenter. The film was then kept at 50° C. for 30 seconds with the stretched width kept remained. The clip was then detached from the film to prepare a cellulose acetate film. At the end of stretching, the residual solvent content was 5% by weight. The film was then dried to a residual solvent content of less than 0.1% by weight to prepare a film (PK-H2). The cellulose acylate used had Tg of 140° C.

The cellulose acylate film (PK-H2) thus prepared had a thickness of 88 μm. The cellulose acylate film was then measured for retardation value (Re) at a wavelength of 550 nm. The result was 70 nm. The test specimen was also measured for retardation value (Rth) at a wavelength of 550 nm. The result was 210 nm.

The test specimen was similarly measured for retardation value (Re) at a wavelength of 450 nm and 650 nm. The results were 73 nm and 68 nm, respectively. The test specimen was then similarly measured for retardation value (Rth) at a wavelength of 450 nm and 650 nm. The results were 214 nm and 208 nm, respectively.

In other words, A1 value and A2 value were 1.04 and 0.97, respectively. Further, B1 value and B2 value were 1.02 and 0.98, respectively. P value was 0.03.

An optically anisotropic layer containing a rod-shaped liquid crystal compound was formed on PK-H2 in the same manner as in Example 6 to prepare a rolled optically compensatory film (KH-H2). Only the optically anisotropic layer comprising a rod-shaped liquid crystal compound was peeled off KH-H2. The optically anisotropic layer thus peeled was then measured for optical properties. Re and Rth of the optically anisotropic layer measured at a wavelength of 550 nm were 0 nm and −280 nm, respectively. It was further confirmed that an optically anisotropic layer aligned substantially vertically to the surface of the film had been formed.

EXAMPLE 7

Preparation of Polarizing Plate (P-1)

A stretched polyvinyl alcohol film was allowed to adsorb iodine to prepare a polarizer. Subsequently, the optically compensatory film (KH-4) prepared in Example 4 was stuck to one side of the polarizer with a polyvinyl alcohol-based adhesive. The two components were disposed such that the transmission axis of the polarizer and the slow axis of the retarder plate (KH-4) were parallel to each other.

A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-1) was prepared.

EXAMPLE 8

Preparation of Polarizing Plate (P-2)

A stretched polyvinyl alcohol film was allowed to adsorb iodine to prepare a polarizer. Subsequently, the optically compensatory film (KH-2) prepared in Example 2 was stuck to one side of the polarizer with a polyvinyl alcohol-based adhesive. The two components were disposed such that the transmission axis of the polarizer and the slow axis of the retarder plate (KH-2) were parallel to each other.

A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-2) was prepared.

COMPARATIVE EXAMPLE 3

Preparation of Polarizing Plate (P-H1)

A stretched polyvinyl alcohol film was allowed to adsorb iodine to prepare a polarizer. Subsequently, the optically compensatory film (KH-H1) prepared in Comparative Example 1 was stuck to one side of the polarizer with a polyvinyl alcohol-based adhesive. The two components were disposed such that the transmission axis of the polarizer and the slow axis of the retarder plate (KH-H1) were parallel to each other.

A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-H1) was prepared.

EXAMPLE 9

Preparation of Polarizing Plate (P-3)

A stretched polyvinyl alcohol film was allowed to adsorb iodine to prepare a polarizer. Subsequently, the optically compensatory film (KH-6) prepared in Example 6 was stuck to one side of the polarizer with a polyvinyl alcohol-based adhesive. The two components were disposed such that the transmission axis of the polarizer and the slow axis of the retarder plate (KH-6) were parallel to each other. A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-3) was prepared.

COMPARATIVE EXAMPLE 4

Preparation of Polarizing Plate (P-H2)

A stretched polyvinyl alcohol film was allowed to adsorb iodine to prepare a polarizer. Subsequently, the optically compensatory film (KH-H2) prepared in Comparative Example 2 was stuck to one side of the polarizer with a polyvinyl alcohol-based adhesive. The two components were disposed such that the transmission axis of the polarizer and the slow axis of the retarder plate (KH-H2) were parallel to each other. A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-H2) was prepared.

[Preparation of Other Polarizing Plates]

<Preparation of Polarizing Plate (P-Z)>

(Preparation of Cellulose Acetate Solution)

The following components were charged in a mixing tank where they were then heated with stirring to cause the dissolution thereof. Thus, a cellulose triacetate solution A was prepared.

| Formulation of cellulose acetate solution A | |
|---|---|
| Cellulose acetate (percent substitution: 2.94) | 100.0 parts by weight |
| Methylene chloride (first solvent) | 402.0 parts by weight |
| Methanol (second solvent) | 60.0 parts by weight |

(Preparation of Matting Agent Solution)

20 parts by weight of particulate silica having an average particle diameter of 16 nm (AEROSIL R972, produced by Nippon Aerosil Co., Ltd.) and 80 parts by weight of methanol were thoroughly mixed with stirring for 30 minutes to prepare a particulate silica dispersion. This dispersion was charged in a dispersing machine together with the following composition. The mixture was then stirred for 30 minutes to cause the dissolution thereof. Thus, a matting agent solution was prepared.

| Formulation of matting agent solution | |
|---|---|
| Dispersion of particulate silica having average particle diameter of 16 nm | 10.0 parts by weight |
| Methylene chloride (first solvent) | 76.3 parts by weight |
| Methanol (second solvent) | 3.4 parts by weight |
| Cellulose acetate solution A | 10.3 parts by weight |

(Preparation of Additive Solution)

The following components were charged in a mixing tank where they were then heated with stirring to cause the dissolution thereof. Thus, a cellulose triacetate solution was prepared.

| Formulation of additive solution | |
|---|---|
| Optical anisotropy decreaser shown below | 49.3 parts by weight |
| Wavelength dispersion adjustor shown below | 4.9 parts by weight |
| Methylene chloride (first solvent) | 58.4 parts by weight |
| Methanol (second solvent) | 8.7 parts by weight |
| Cellulose acetate solution A | 12.8 parts by weight |

Optical anisotropy decreaser

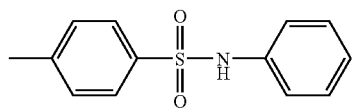

-continued

Formulation of additive solution

Wavelength dispersion adjustor

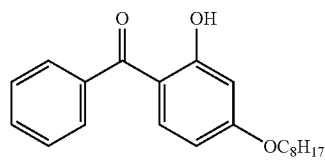

(Preparation of Cellulose Acetate Film A)

96.7 parts by weight of the cellulose acetate solution A, 1.3 parts by weight of the matting agent solution and 2.0 parts by weight of the additive solution were each filtered, mixed, and then casted using a band casting machine. The weight ratio of the compound having the aforementioned formulation for decreasing the optical anisotropy and the wavelength dispersion adjustor to the cellulose acetate were 6% and 0.6%, respectively. The film having a residual solvent content of 30% was peeled off the band, and then dried at 140° C. for 40 minutes to prepare a cellulose acetate film A of continuous length having a thickness of 80 μm. Subsequently, the cellulose acetate film A was saponified on the surface thereof.

The cellulose acetate film A thus prepared was then measured for optical properties. The cellulose acetate film A was moisture-conditioned at 25° C. and 55% RH for 2 hours, and then measured for retardation value (Re) at a wavelength of 550 nm. The result was 1.0 nm. The test specimen was also measured for retardation value (Rth) at a wavelength of 550 nm. The result was −1.0 nm.

(Preparation of Polarizing Plate (P-Z))

A stretched polyvinyl alcohol film was allowed to adsorb iodine to prepare a polarizer. Subsequently, the cellulose acetate film A prepared above was stuck to one side of the polarizer with a polyvinyl alcohol-based adhesive. A commercially available cellulose acetate film (FUJITAC TD80UF, produced by Fuji Photo Film Co., Ltd.) was saponified, and then stuck to the other side of the polarizer with a polyvinyl alcohol-based adhesive. In this manner, a polarizing plate (P-Z) was prepared.

EXAMPLE 10

Package Evaluation on OCB Liquid Crystal Display (Preparation of Bend-Aligned Liquid Crystal Cell)

A polyimide film was provided as an alignment film on a glass substrate with ITO electrode. The alignment film was subjected to rubbing. Two sheets of the glass substrates thus obtained were laminated on each other in such an arrangement that the rubbing direction of the two sheets are parallel to each other. The cell gap was predetermined to be 4.7 μm. Into the cell gap was then injected a liquid crystal compound having Δn of 0.1396 "ZLI1132" (produced by Melc Co., Ltd.) to prepare a bend-aligned liquid crystal cell.

(Package Evaluation on Liquid Crystal Display)

Two sheets of the polarizing plates (P-1) prepared in Example 7 were laminated on each other with the aforementioned bend-aligned cell interposed therebetween. Arrangement was made such that the optically anisotropic layer of the polarizing plate was opposed to the cell substrate and the rubbing direction of the liquid crystal cell and the rubbing direction of the "other" optically anisotropic layer opposed to the liquid crystal cell were not parallel to each other.

A 55 Hz rectangular voltage was applied to the liquid crystal cell. The liquid crystal cell was of normally white mode attained by 2 V for white display and 5 V for black display. With the application of a voltage by which the front transmission is minimum, i.e., black voltage, the percent black display transmission (%) at viewing angles in the direction of an azimuthal angle of 0° and a polar angle of 60° and the color difference Δx between at azimuthal angle of 0°-polar angle of 60° and at an azimuthal angle of 180°-polar angle of 60° were determined. The results are set forth in Table 1. In order to determine the transmission ratio (white display/black display) as contrast ratio, the liquid crystal cell was measured for viewing angle at 8 steps from black display (L1) to white display (L8) using a Type EZ-Contrast 160D measuring instrument (produced by ELDIM Co., Ltd.). The results are set forth in Table 2.

COMPARATIVE EXAMPLE 5

A liquid crystal cell was prepared in the same manner as in Example 10 except that the polarizing plate (P-H1) of Comparative Example 3 was used instead of the polarizing plate of Example 7. The liquid crystal cell thus prepared was then measured for color difference and black display transmission. The results are set forth in Table 1. The liquid crystal cell was also evaluated for viewing angle. The results are set forth in Table 2.

TABLE 1

| | Re/Rth | | | B1 | B2 | Color | |
| | A: 450 nm | B: 550 nm | C: 650 nm | A/B | C/B | difference | Transmission |
| --- | --- | --- | --- | --- | --- | --- | --- |
| Example 10 | 0.18 | 0.28 | 0.38 | 0.64 | 1.35 | 0.05 | 0.01 |
| Comparative Example 5 | 0.22 | 0.22 | 0.22 | 1.00 | 1.00 | 0.40 | 0.08 |

(Note)
Color difference: Sum of difference between u'v' (polar angle of 60°) and u'v' (polar angle of 0°) at an azimuthal angle of 0° and difference between u'v' (polar angle of 60°) and u'v' (polar angle of 0°) at an azimuthal angle of 180° in u'v' coordinates As can be seen in the results of Table 1, the liquid crystal display of the invention of Example 10, which has Re/Rth (450 nm): A of 0.64 times Re/Rth(550 nm): B (falling within a range of from 0.40 to 0.95 times) and Re/Rth(650 nm): C of 1.35 times Re/Rth(550 nm): B (falling within a range of from 1.05 to 1.93 times), exhibits a low transmission during black display at a polar angle of 60° and a small color difference from front as compared with the liquid crystal display of Comparative Example 5, which has Re/Rth(450 nm): A of 1.00 times Re/Rth(550 nm): B (falling outside the above defined range) and Re/Rth(650 nm): C of 1.00 times Re/Rth (550 nm): B (falling outside the above defined range).

TABLE 2

| Liquid crystal display | Viewing angle (range within which the contrast ratio is 10 or more and no gradation inversion occurs on black side) | | |
|---|---|---|---|
| | Upper | Lower | Right and left |
| Example 10 | 80° | 80° | 80° |
| Comparative Example 5 | 80° | 80° | 80° |

(Note)
Gradation inversion on black side: inversion between L1 and L2

EXAMPLE 11

Package Evaluation on VA Liquid Crystal Display (Preparation of VA Aligned Liquid Crystal Cell)

The liquid crystal cell had a cell gap of 3.6 μm between the substrates. The liquid crystal cell was prepared by dropwise injecting a liquid crystal material having a negative dielectric anisotropy ("MLC6608", produced by Merck Ltd.) into the gap between the substrates, and then closing the gap to form a liquid crystal layer between the substrates. The retardation of the liquid crystal layer (i.e., produce Δn·d of the thickness d (μm) of the liquid crystal layer and the refractive anisotropy Δn) was predetermined to be 300 nm. The liquid crystal material was aligned vertically.

(Package Evaluation on Liquid Crystal Display)

The polarizing plate (P-2) prepared in Example 8 was stuck to the upper and lower polarizing plates of a liquid crystal display comprising the aforementioned vertically-aligned liquid crystal cell with an adhesive each on the viewer side and backlight side thereof in such an arrangement that the optically compensatory film (KH-2) of Example 2 was disposed on the liquid crystal cell side thereof. The liquid crystal display was arranged in crossed Nicols such that the transmission axis of the polarizing plate on the viewer side is disposed vertically and the transmission axis of the polarizing plate on the backlight side is disposed horizontally.

A 55 Hz rectangular voltage was applied to the liquid crystal cell. The liquid crystal cell was of normally black mode attained by 5 V for white display and 0 V for black display. The percent black display transmission (%) at viewing angles in the direction of an azimuthal angle of 0° and a polar angle of 60° and the color difference Δx between at azimuthal angle of 0°-polar angle of 60° and at an azimuthal angle of 180°-polar angle of 60° were determined. The results are set forth in Table 3. In order to determine the transmission ratio (white display/black display) as contrast ratio, the liquid crystal cell was measured for viewing angle at 8 steps from black display (L1) to white display (L8) using a Type EZ-Contrast 160D measuring instrument (produced by ELDIM Co., Ltd.). The results are set forth in Table 4.

TABLE 3

| | Re/Rth | | | B1 | B2 | Color | |
|---|---|---|---|---|---|---|---|
| | A: 450 nm | B: 550 nm | C: 650 nm | A/B | C/B | difference | Transmission |
| Example 11 | 0.13 | 0.23 | 0.32 | 0.56 | 1.36 | 0.06 | 0.02 |

(Note)
Color difference: Sum of difference between u'v' (polar angle of 60°) and u'v' (polar angle of 0°) at an azimuthal angle of 0° and difference between u'v' (polar angle of 60°) and u'v' (polar angle of 0°) at an azimuthal angle of 180° in u'v' coordinates As can be seen in the results of Table 3, the liquid crystal display of the invention of Example 11, which has Re/Rth (450 nm): A of 0.56 times Re/Rth(550 nm): B (falling within a range of from 0.40 to 0.95 times) and Re/Rth(650 nm): C of 1.93 times Re/Rth(550 nm): B (falling within a range of from 1.05 to 1.93 times), exhibits a low transmission during black display at a polar angle of 60° and a small color difference from front.

| Liquid crystal display | Viewing angle (range within which the contrast ratio is 10 or more and no gradation inversion occurs on black side) | | |
|---|---|---|---|
| | Upper | Lower | Right and left |
| Example 11 | 80° | 80° | 80° |

(Note)
Gradation inversion on black side: inversion between L1 and L2

EXAMPLE 12

Package Evaluation on IPS Liquid Crystal Display (Preparation of IPS Liquid Crystal Cell)

Figure 8:
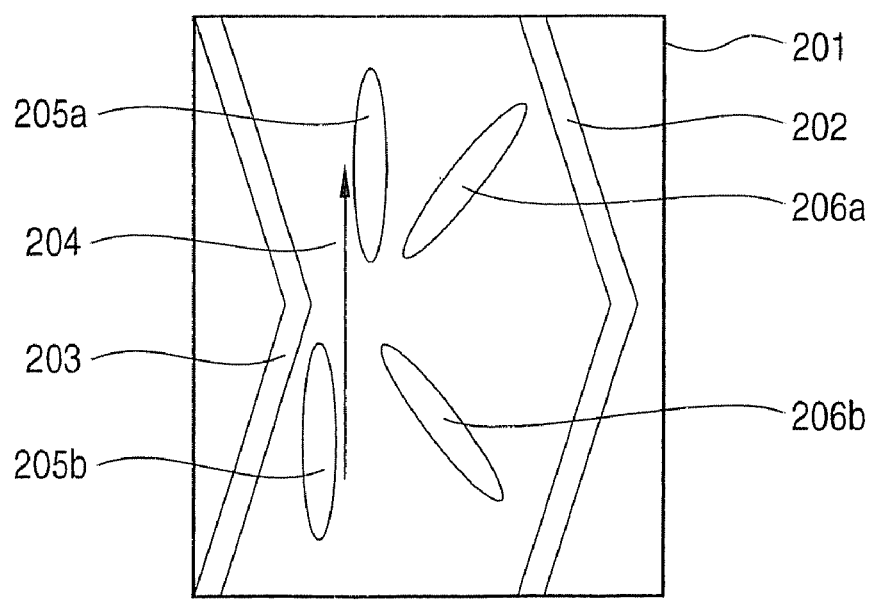
FIG. 8 is a schematic diagram illustrating an illustrative, non-limiting example of pixel region in an IPS mode liquid crystal display of the invention.

Electrodes were provided on a sheet of glass substrate in such an arrangement that the distance between the adjacent electrodes was 20 µm. A polyimide film was then provided on the electrodes as an alignment film. The alignment film was then subjected to rubbing in the direction 4 shown in FIG. 8. A polyimide film was provided on one surface of a separate sheet of glass substrate. The polyimide film was then subjected to rubbing to form an alignment film. The two sheets of glass substrates were then laminated in such an arrangement that the alignment films thereof were opposed to each other to form a cell gap (d) of 3.9 µm and the rubbing direction of the two sheets of glass substrates were parallel to each other. Subsequently, a nematic liquid crystal composition having a refractive anisotropy (Δn) of 0.0769 and a dielectric anisotropy (Δ∈) of +4.5 was injected into the cell gap to prepare a horizontally-aligned liquid crystal cell. The liquid crystal layer had Δn·d of 300 nm.

(Package Evaluation on Liquid Crystal Display)

The polarizing plate (P-3) and the polarizing plate (P-Z) were stuck to the upper and lower glass substrates of the horizontally-aligned cell, respectively, with an adhesive. In some detail, arrangement was made such that the optically compensatory film (KH-6) incorporated in the polarizing plate (P-3) came in contact with the viewer side glass substrate and the cellulose acetate film A incorporated in the polarizing plate (P-Z) came in contact with the backlight side glass substrate. Further, the absorption axis of the polarizing plate (P-3) and the rubbing direction of the liquid crystal cell were disposed parallel to each other and the absorption axis of the polarizing plate (P-3) and the polarizing plate (P-Z) were disposed perpendicular to each other.

A 55 Hz rectangular voltage was applied to the liquid crystal cell. The liquid crystal cell was of normally black mode attained by 5 V for white display and 0 V for black display. The liquid crystal cell was then measured for brightness and tint in the front direction and oblique direction (azimuthal angle: 45°; polar angle: ±60°) in black display, color difference in oblique direction from front direction and brightness deviation. The results are set forth in Table 5.

COMPARATIVE EXAMPLE 6

A liquid crystal cell was prepared in the same manner as in Example 12 except that the polarizing plate (P-H2) of Comparative Example 4 was used instead of the polarizing plate (P-3) of Example 12. The liquid crystal cell thus prepared was then measured for color difference and transmission in black display. The results are set forth in Table 5.

and Re/Rth(650 nm): C of 0.98 times Re/Rth(550 nm): B (falling outside the above defined range).

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. and JP2005-125357, both filed Apr. 22, 2005, and JP2005-192312 and JP2005-192313, both filed Jun. 30, 2005, the contents of which are incorporated herein by reference.

The invention claimed is:

1. An optical film comprising a transparent polymer film, wherein the optical film is produced by stretching the transparent polymer film at a temperature of (Tg+25° C.) to (Tg+100° C.), Tg being a glass transition point of a polymer of the transparent polymer film, and the optical film has an A1 value defined by equation (1) of 0.10 to 0.95 and an A2 value defined by equation (2) of 1.01 to 1.50:

$$A1\ value = Re\ (450)/Re\ (550) \quad (1)$$

$$A2\ value = Re\ (650)/Re\ (550) \quad (2)$$

wherein Re (λ) represents a retardation value of the optical film with respect to light having a wavelength of λ nm,
wherein the transparent polymer film comprises a compound in an amount of 0.01 to 30% by weight, the compound having a maximum absorption wavelength λ max shorter than 250 nm in an ultraviolet absorption spectrum of a solution of the compound.

2. The optical film according to claim 1, wherein the transparent polymer film has a crystallization peak in an X-ray diffractometry thereof.

3. The optical film according to claim 1, wherein the transparent polymer film has a degree of alignment of 0.04 to 0.03, the degree of alignment being calculated from an X-ray diffractometry of the transparent polymer film and defined by equation (3):

$$P = <3\cos^2\beta - 1>/2 \quad (3)$$

wherein $<\cos^2\beta>$ represents $\int(0, \pi) \cos^2\beta l(\beta) \sin\beta d\beta / \int(0, \pi) l(\beta) \sin\beta d\beta$; β is an angle of a surface on which X-ray is

TABLE 5

|  | Re/Rth | | | B1 | B2 | Color | Brightness |
|---|---|---|---|---|---|---|---|
|  | A: 450 nm | B: 550 nm | C: 650 nm | A/B | C/B | difference (Note 1) | deviation (Note 2) |
| Example 12 | 0.22 | 0.33 | 0.45 | 0.66 | 1.36 | 0.08 | 2.6 |
| Comparative Example 6 | 0.34 | 0.33 | 0.33 | 1.02 | 0.98 | 0.25 | 2.9 |

(Note 1) Color difference: Sum of difference between u'v' (polar angle of 60°) and u'v' (polar angle of 0°) at an azimuthal angle of 45° and difference between u'v' (polar angle of 60°) and u'v' (polar angle of 0°) at an azimuthal angle of 225° in u'v' coordinates
(Note 2) Brightness in oblique direction (azimuthal angle of 45°; polar angle of 60°)/brightness in front direction As can be seen in the results of Table 5, the liquid crystal display of the invention of Example 12, which has Re/Rth (450 nm): A of 0.66 times Re/Rth(550 nm): B (falling within a range of from 0.40 to 0.95 times) and Re/Rth(650 nm): C of 1.36 times Re/Rth(550 nm): B (falling within a range of from 1.05 to 1.93 times), exhibits a small color difference from front at a polar angle of 60° and a small brightness deviation as compared with the liquid crystal display of Comparative Example 6, which has Re/Rth(450 nm): A of 1.02 times Re/Rth(550 nm): B (falling outside the above defined range)

incident with respect to one direction in a plane of the transparent polymer film; and l is a diffraction intensity at 2θ of 8° in an X-ray diffraction chart measured at the angle β, wherein 2θ is a diffraction angle.

4. The optical film according to claim 1, wherein the transparent polymer film comprises a compound in an amount of 0.01 to 20% by weight, the compound having a maximum absorption wavelength λmax longer than 250 nm in an ultraviolet absorption spectrum of a solution of the compound.

5. The optical film according to claim 1, which comprises an optically anisotropic layer comprising a discotic liquid crystal compound, wherein the discotic liquid crystal compound has a disc surface having an angle of 5 degrees or less with respect to a surface of the transparent polymer film.

6. The optical film according to claim 1, which comprises an optically anisotropic layer comprising a rod-shaped liquid crystal compound, wherein the rod-shaped liquid crystal compound has a major axis having an angle of 5 degrees or less with respect to a surface of the transparent polymer film.

7. The optical film according to claim 1, wherein the transparent polymer film comprises cellulose acylate.

8. The optical film according to claim 1, which has a B1 value defined by equation (4) of from 0.40 to 0.95, a B2 value defined by equation (5) of 1.05 to 1.93, and Rth (550) of 70 nm to 400 nm:

$$B1\ value = \{Re\ (450)/Rth\ (450)\}/\{Re\ (550)/Rth\ (550)\} \quad (4)$$

$$B2\ value = \{Re\ (650)/Rth\ (650)\}/\{Re\ (550)/Rth\ (550)\} \quad (5)$$

wherein Re ($\lambda$) represents a retardation value of the optical film with respect to light having a wavelength of $\lambda$ nm, and Rth ($\lambda$) is a retardation value in a thickness direction of the optical film with respect to light having a wavelength of $\lambda$ nm.

9. A polarizing plate comprising: a polarizer; and an optical film according to claim 1.

10. A liquid crystal display comprising: a liquid crystal cell; and a polarizing plate according to claim 9.

11. The liquid crystal display according to claim 10, wherein the liquid crystal cell is of VA, OCB or IPS mode.

12. An optical film comprising a transparent polymer film, wherein the optical film has an A1 value defined by equation (1) of 0.10 to 0.95, an A2 value defined by equation (2) of 1.01 to 1.50, a B1 value defined by equation (4) of from 0.40 to 0.95, a B2 value defined by equation (5) of 1.05 to 1.93, and Rth (550) of 70 nm to 400 nm:

$$A1\ value = Re\ (450)/Re\ (550) \quad (1)$$

$$A2\ value = Re\ (650)/Re\ (550) \quad (2)$$

$$B1\ value = \{Re\ (450)/Rth\ (450)\}/\{Re\ (550)/Rth\ (550)\} \quad (4)$$

$$B2\ value = \{Re\ (650)/Rth\ (650)\}/\{Re\ (550)/Rth\ (550)\} \quad (5)$$

wherein Re ($\lambda$) represents a retardation value of the optical film with respect to light having a wavelength of $\lambda$ nm; and Rth ($\lambda$) is a retardation value in a thickness direction of the optical film with respect to light having a wavelength of $\lambda$ nm,
wherein the transparent polymer film comprises a compound in an amount of 0.01 to 30% by weight, the compound having a maximum absorption wavelength $\lambda$ max shorter than 250 nm in an ultraviolet absorption spectrum of a solution of the compound.

13. The optical film according to claim 12, wherein the transparent polymer film has a crystallization peak in an X-ray diffractometry thereof.

14. The optical film according to claim 12, wherein the transparent polymer film has a degree of alignment of 0.04 to 0.03, the degree of alignment being calculated from an X-ray diffractometry of the transparent polymer film and defined by equation (3):

$$P = <3\cos^2\beta - 1>/2 \quad (3)$$

wherein $<\cos^2\beta>$ represents $\int(0, \pi) \cos^2\beta l(\beta) \sin\beta d\beta / \int(0, \pi) l(\beta) \sin\beta d\beta$; $\beta$ is an angle of a surface on which X-ray is incident with respect to one direction in a plane of the transparent polymer film; and l is a diffraction intensity at 2θ of 8° in an X-ray diffraction chart measured at the angle $\beta$, wherein 2θ is a diffraction angle.

15. The optical film according to claim 12, wherein the transparent polymer film comprises a compound in an amount of 0.01 to 20% by weight, the compound having a maximum absorption wavelength $\lambda$max longer than 250 nm in an ultraviolet absorption spectrum of a solution of the compound.

16. The optical film according to claim 12, which comprises an optically anisotropic layer comprising a discotic liquid crystal compound, wherein the discotic liquid crystal compound has a disc surface having an angle of 5 degrees or less with respect to a surface of the transparent polymer film.

17. The optical film according to claim 12, which comprises an optically anisotropic layer comprising a rod-shaped liquid crystal compound, wherein the rod-shaped liquid crystal compound has a major axis having an angle of 5 degrees or less with respect to a surface of the transparent polymer film.

18. The optical film according to claim 12, wherein the transparent polymer film comprises cellulose acylate.

19. The optical film according to claim 1, wherein the compound having a maximum absorption wavelength $\lambda$max shorter than 250 nm in an ultraviolet absorption spectrum of a solution of the compound is a rod-shaped compound having at least one aromatic ring.

20. The optical film according to claim 12, wherein the compound having a maximum absorption wavelength $\lambda$max shorter than 250 nm in an ultraviolet absorption spectrum of a solution of the compound is a rod-shaped compound having at least one aromatic ring.

21. A method for producing an optical film comprising a transparent polymer film, which comprises stretching the transparent polymer film at a temperature of (Tg+25° C.) to (Tg+100° C.), wherein Tg is a glass transition point of a polymer of the transparent polymer film,
wherein the transparent polymer film comprises a compound in an amount of 0.01 to 30% by weight, the compound having a maximum absorption wavelength $\lambda$max shorter than 250 nm in an ultraviolet absorption spectrum of a solution of the compound.

* * * * *